US012777108B2

(12) United States Patent
Kim et al.

(10) Patent No.: US 12,777,108 B2
(45) Date of Patent: Oct. 27, 2026

(54) ELECTRONIC DEVICE COMPRISING HINGE STRUCTURE FOR PREVENTING DISPLAY FROM BEING DAMAGED

(71) Applicant: SAMSUNG ELECTRONICS CO., LTD., Suwon-si (KR)

(72) Inventors: Hyungsoo Kim, Suwon-si (KR); Jongkeun Kim, Suwon-si (KR); Jongyoon Kim, Suwon-si (KR); Daehyeong Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 293 days.

(21) Appl. No.: 18/585,038

(22) Filed: Feb. 22, 2024

(65) Prior Publication Data

US 2024/0205313 A1 Jun. 20, 2024

Related U.S. Application Data

(63) Continuation of application No. PCT/KR2022/010447, filed on Jul. 18, 2022.

(30) Foreign Application Priority Data

Sep. 16, 2021 (KR) ........................ 10-2021-0123571
Oct. 26, 2021 (KR) ........................ 10-2021-0143806

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .... H04M 1/0216; H04M 1/0268; H04M 1/02; H04M 1/022; G06F 1/1652; G06F 1/1681
See application file for complete search history.

(56) References Cited

U.S. PATENT DOCUMENTS

| | | | |
|---|---|---|---|
| 9,250,733 | B2 | 2/2016 | Lee et al. |
| 11,009,061 | B2 | 5/2021 | Chang et al. |

(Continued)

FOREIGN PATENT DOCUMENTS

| | | | |
|---|---|---|---|
| CN | 113067923 | A | 7/2021 |
| CN | 113357256 | A | 9/2021 |

(Continued)

OTHER PUBLICATIONS

The extended European search report for EP Application No. 22870116.5 mailed on Oct. 11, 2024.

(Continued)

*Primary Examiner* — Md K Talukder
(74) *Attorney, Agent, or Firm* — CANTOR COLBURN LLP

(57) ABSTRACT

An electronic device includes a first housing, a second housing, a display supported by the first housing and the second housing, and a hinge structure rotatably connecting the first housing and the second housing, wherein the hinge structure includes a body including a first guide groove forming a first rotation path and a second groove forming a second rotation path having a second rotation axis different from the first rotation axis of the first rotation path, and facing the display, a first rotating plate including a first pin in the first guide groove moved along the first rotation path and a second pin in the second guide groove moved along the second rotation path, to pivotably connect a side of the body, and a second rotating plate pivotably connected to the first rotating plate and having a slope relative to the first rotating plate in the folded state of the electronic device. Other embodiments are possible.

19 Claims, 35 Drawing Sheets

(56) References Cited

U.S. PATENT DOCUMENTS

| | | | | |
|---|---|---|---|---|
| 11,287,853 | B2 | 3/2022 | Yao et al. | |
| 2006/0188092 | A1 | 8/2006 | Pontoppidan et al. | |
| 2016/0295709 | A1* | 10/2016 | Ahn | G06F 1/1615 |
| 2018/0330694 | A1* | 11/2018 | Klein | G06F 9/44505 |
| 2020/0383219 | A1* | 12/2020 | Hale | E05D 3/06 |
| 2021/0044682 | A1 | 2/2021 | Liu et al. | |
| 2021/0181808 | A1* | 6/2021 | Liao | H04M 1/0216 |
| 2022/0116489 | A1* | 4/2022 | Nagai | G06F 1/1652 |
| 2022/0163987 | A1 | 5/2022 | Zhu et al. | |
| 2022/0303371 | A1* | 9/2022 | Liao | H04M 1/0216 |
| 2023/0037466 | A1* | 2/2023 | Park | G06F 1/1618 |
| 2023/0143520 | A1* | 5/2023 | Park | G06F 1/16 455/566 |
| 2023/0359252 | A1 | 11/2023 | Kang et al. | |
| 2024/0004430 | A1* | 1/2024 | Zhao | H04M 1/0268 |
| 2024/0028084 | A1* | 1/2024 | Feng | E05D 3/122 |
| 2024/0069604 | A1* | 2/2024 | Xu | G06F 1/1652 |
| 2024/0205313 | A1* | 6/2024 | Kim | G06F 1/1681 |

FOREIGN PATENT DOCUMENTS

| | | | |
|---|---|---|---|
| JP | 2021033192 | A | 3/2021 |
| KR | 100807158 | B1 | 2/2008 |
| KR | 101875855 | B1 | 7/2018 |
| KR | 101891188 | B1 | 9/2018 |
| KR | 20200005148 | A | 1/2020 |
| KR | 20200128330 | A | 11/2020 |
| KR | 20210068880 | A | 6/2021 |
| WO | 2020259646 | A1 | 12/2020 |
| WO | 2021115462 | A1 | 6/2021 |
| WO | 2021129882 | A1 | 7/2021 |

OTHER PUBLICATIONS

International Search Report mailed Oct. 24, 2022 for PCT/KR2022/010447.

Korean Office Action for Korean Application No. 10-2021-0143806; Report Mail Date Feb. 6, 2026 (21 Pages—with English Translation).

* cited by examiner

ELECTRONIC DEVICE COMPRISING HINGE STRUCTURE FOR PREVENTING DISPLAY FROM BEING DAMAGED

CROSS REFERENCE TO RELATED APPLICATION(S)

This application is a by-pass continuation application of International Application No. PCT/KR2022/010447, filed on Jul. 18, 2022, which is based on and claims priority to Korean Patent Application No. 10-2021-0123571, filed on Sep. 16, 2021, in the Korean Intellectual Property Office, and Korean Patent Application No. 10-2021-0143806, filed on Oct. 26, 2021, in the Korean Intellectual Property Office, the disclosures of which are incorporated by reference herein their entireties.

TECHNICAL FIELD

The following descriptions relate to an electronic device comprising hinge structure for preventing fracture of display.

BACKGROUND ART

In response to demand for an electronic device that is easy to carry and provides a large screen, demand for an electronic device adopting a foldable display is increasing. An electronic device including a foldable display may include a hinge structure to switch a display to a folded state or an unfolded state. The electronic device may maintain the display in the folded state when moving to enhance a user's portability and provide the display in the unfolded state when using the electronic device to provide a large screen.

In a foldable display, a compressive force may be repeatedly applied to a bending area according to a switch to a folded state and an unfolded state. The foldable display may be damaged by repeatedly applied the compressive force. A method to prevent damage to the foldable display is required.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment, an electronic device may comprise a first housing including a first surface and a second surface faced away from the first surface, a second housing including a third surface and a fourth surface faced away from the third surface, a display including a first area disposed on the first surface and a second area disposed on the third surface and a third area disposed between the first area and the second area, and disposed on the first surface and the third surface, and a hinge structure pivotably connecting the first housing and the second housing, wherein the hinge structure may include a body including a first guide groove forming a first rotation path and a second groove forming a second rotation path having a second rotation axis different from a first rotation axis, and facing the third area of the display, a first rotating plate including a first pin in the first guide groove moved along the first rotation path having the first rotation axis and a second pin in the second guide groove moved along the second rotation path having the second rotation axis while the first pin is moved to pivotably connect to a side of the body, and a second rotating plate supporting the first housing and pivotably connected to the first rotating plate, the second rotating plate having a slope relative to the first rotating plate in a folded state of the electronic device in which a first direction in which the first surface faces is different from a second direction in which the third surface faces.

According to an embodiment, an electronic device may comprise a first housing including a first surface and a second surface faced away from the first surface, a second housing including a third surface and a fourth surface faced away from the third surface, a display including a first area disposed on the first surface and a second area disposed on the third surface and a third area disposed between the first area and the second area, and disposed on the first surface and the third surface, and a hinge structure rotatably connecting the first housing and the second housing, wherein the hinge structure may include a body opposite to the third area of the display, a first rotating plate pivotably connected to a part of the body, a second rotating plate pivotably connected to the first rotating plate, a third rotating plate pivotably connected to another side surface opposite of the part of the body based on a folding axis, and a fourth rotating plate pivotably connected to the third rotating plate, and wherein the second rotating plate may have a slope relative to the first rotating plate.

According to an embodiment, since a rotating body has a plurality of rotation axes, an electronic device including a hinge structure for preventing a display from damaged can reduce a compressive force applied to the display to reduce display damage, by varying a rotation axis of the rotating body.

Since a distance between a variable rotation axis and a neutral surface of the display is shorter than a distance between a neutral surface of the display folded by a rotating body having a rotation axis and the rotation axis, the electronic device may prevent damage by reducing buckling of the display by reducing the compression of the display.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
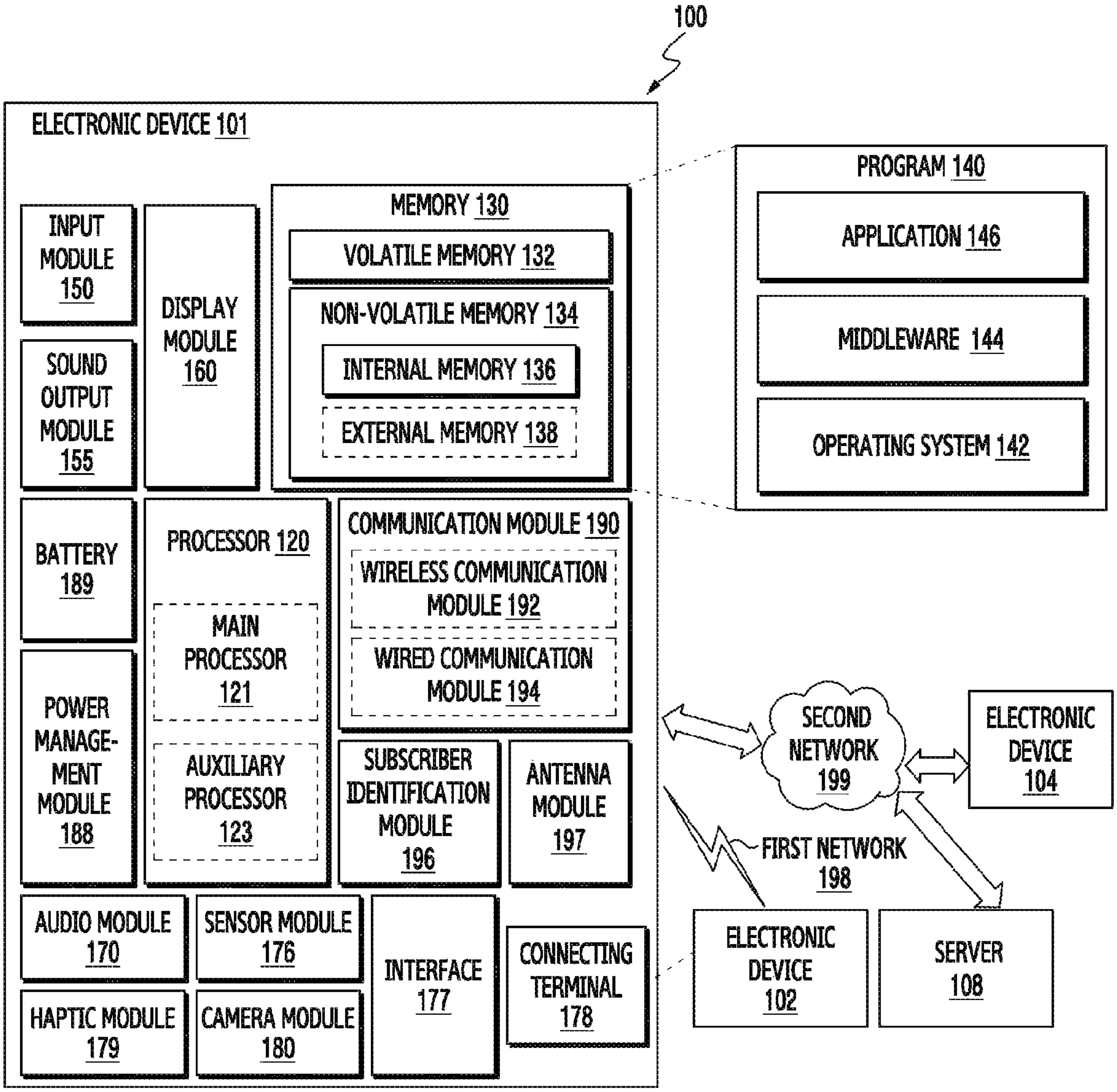
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
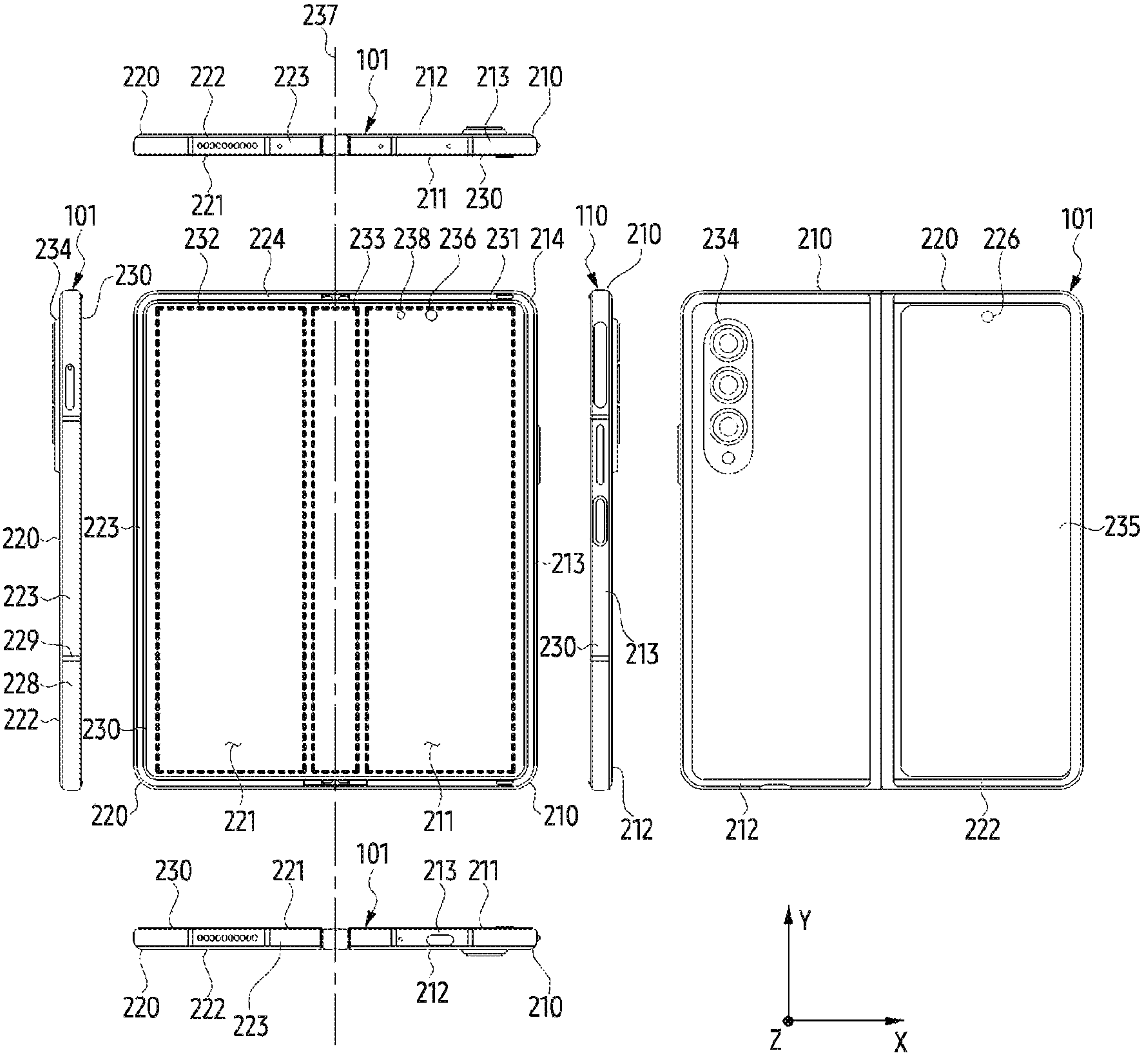
FIG. 2A illustrates an example of an unfolded state of an electronic device, according to an embodiment.
Figure 2B:
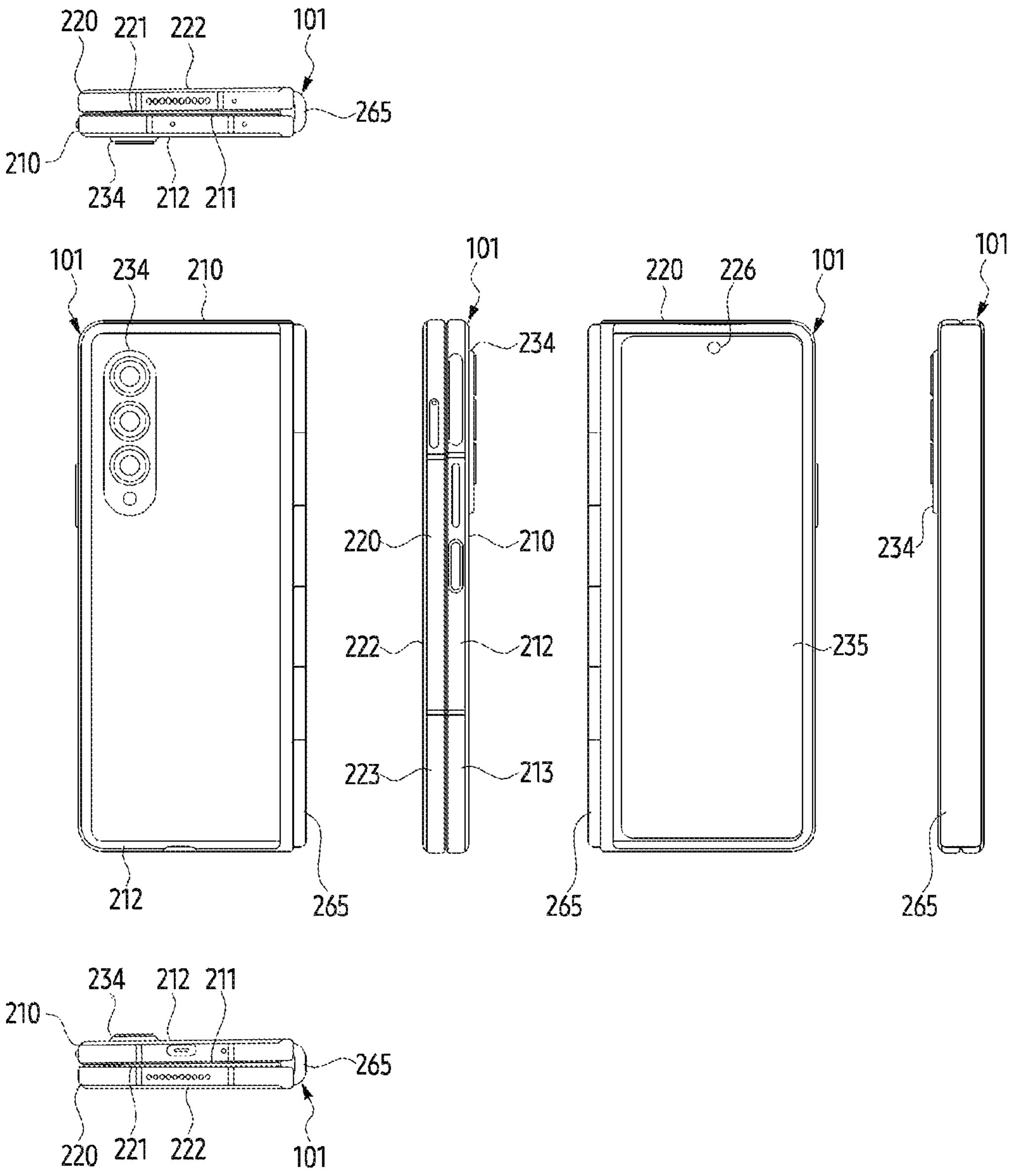
FIG. 2B illustrates an example of a folded state of an electronic device, according to an embodiment.
Figure 2C:
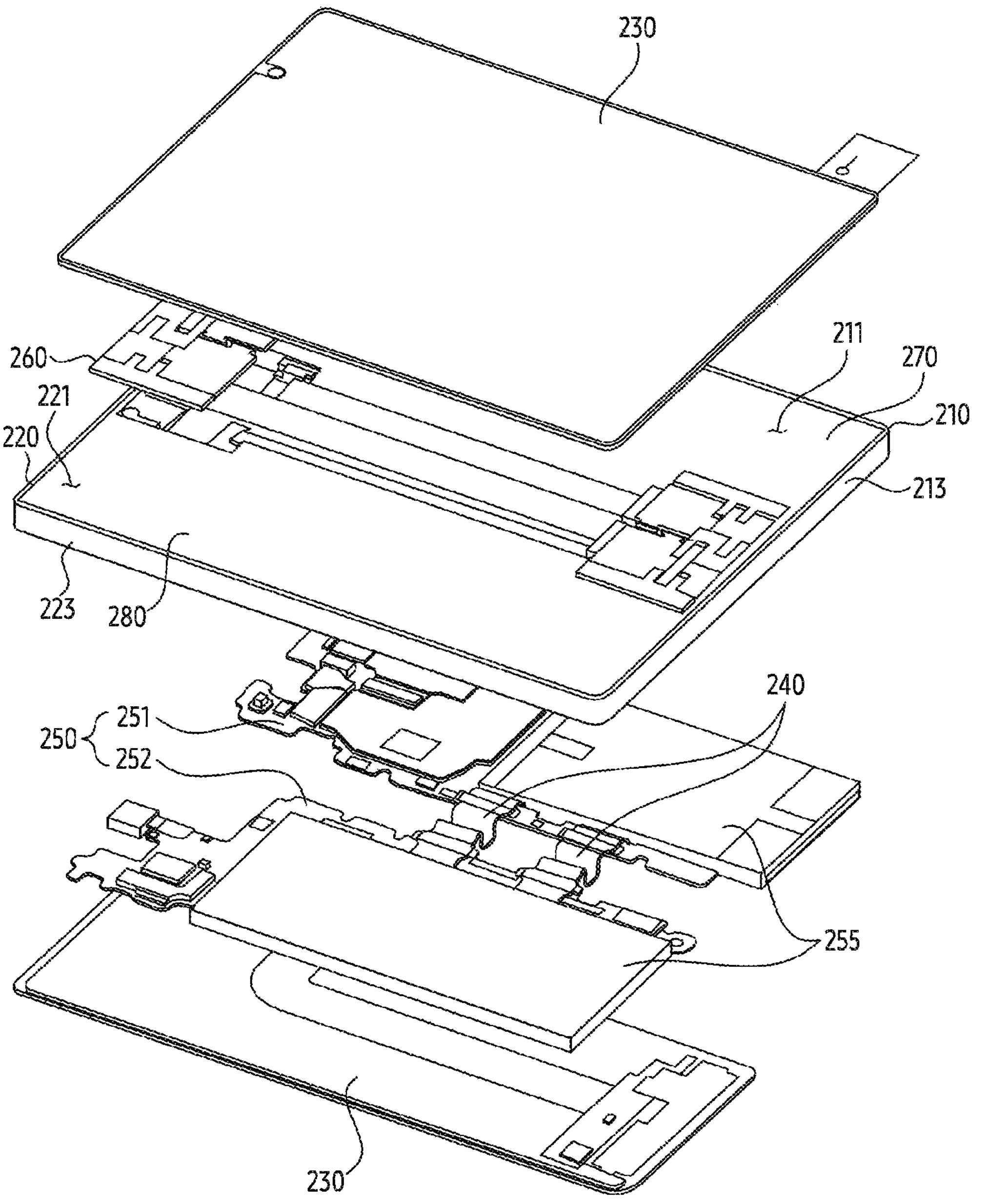
FIG. 2C is an exploded view of an electronic device, according to an embodiment.

FIG. 2A illustrates an example of an unfolded state of an electronic device, according to an embodiment, and FIG. 2B illustrates an example of a folded state of an electronic device, according to an embodiment, and FIG. 2C is an exploded view of an electronic device, according to an embodiment.

Referring to FIGS. 2A, 2B, and 2C, an electronic device 101 may include a first housing 210, a second housing 220, and a flexible display 230.

In an embodiment, the first housing 210 may include a first surface 211, a second surface 212 faced away the first surface 211, and a first side surface 213 surrounding at least a part of the first surface 211 and the second surface 212. In an embodiment, the second surface 212 may further include at least one camera 234 exposed through a part of the second surface 212. In an embodiment, the first housing 210 may include a first protection member 214 disposed along a periphery of the first surface 211. In an embodiment, the first housing 210 may provide a space formed by the first surface 211, the second surface 212, and the side surface 213 as a space for mounting components of the electronic device 101. In an embodiment, the first side surface 213 and a second side surface 223 may include a conductive material, a non-conductive material, or a combination thereof. For example, the second side surface 223 may include a conductive member 228 and a non-conductive member 229. The conductive member 228 may include a plurality of conductive members, and the plurality of conductive members may be spaced apart from each other. The non-conductive member 229 may be disposed between a plurality of conductive members. An antenna structure may be formed by some or a combination of a plurality of conductive members and a plurality of non-conductive members.

In an embodiment, the second housing 220 may include a third surface 221, a fourth surface 222 faced away the third surface 221, and a second side surface 223 surrounding at least a part of the third surface 221 and the fourth surface 222. In an embodiment, the fourth surface 222 may further include a display panel 235 disposed on the fourth surface 222. The camera 226 may be disposed to face the fourth surface 222 inside the second housing 220 so as to obtain an external image through the fourth surface 222. The camera 226 may be disposed under the display panel 235 and covered by the display panel 235. In an embodiment, the camera 226 may be disposed under the display panel 235, and the display panel 235 may include an opening aligned with a lens of the camera 226 to transmit light from the outside to the camera 226. According to an embodiment, each of the first housing 210 and the second housing 220 may include each of a first protection member 214 and a second protection member 224. The first protection member 214 and the second protection member 224 may be disposed on the first surface 211 and the third surface 221 along a periphery of the flexible display 230. The first protection member 214 and the second protection member 224 may prevent inflow of a foreign substance (e.g., dust or moisture) through a gap between the flexible display 230 and the first housing 210 and the second housing 220. The first protection member 214 may be disposed along a periphery of a first display area 231, and the second protection member 224 may be disposed along a periphery of a second display area 232. The first protection member 214 may be formed by being attached to the first side surface 213 of the first housing 210 or may be integrally formed with the first side surface 213. The second protection member 224 may be formed by being attached to the second side surface 223 of the second housing 220 or may be integrally formed with the second side surface 223.

In an embodiment, the second side surface 223 may be pivotably (or rotatably) connected to the first side surface 213 through a hinge structure 260 mounted on a hinge cover 265. The hinge structure 260 may include a hinge module and a rotating plate. The rotating plate may be connected to the first housing 210 and the second housing 220. In an embodiment, the second housing 220 may provide a space formed by the third surface 221, the fourth surface 222 faced away the third surface 221, and the side surface 223 surrounding at least a part of the third surface 221 and the fourth surface 222 as a space for mounting components of the electronic device 101. In an embodiment, the flexible display 230 may include a window exposed to the outside. The window may protect a surface of the flexible display 230 and be formed of a transparent member to transmit visual information provided from the flexible display 230 to the outside. The window may include a glass material such as ultra-thin glass (UTG) or a polymer material such as polyimide (PI). In an embodiment, the flexible display 230 may be disposed on the first surface 211 of the first housing 210 and the third surface 221 of the second housing 220 across the hinge structure 260. The flexible display 230 may include the first display area 231 disposed on the first surface 211 of the first housing, the second display area 232 disposed on the third surface 221 of the second housing, and a third display area 233 between the first display area 231 and the second display area 232. The first display area 231, the second display area 232, and the third display area 233 may form a front surface of the flexible display 230.

According to an embodiment, an opening may be formed in a part of a screen display area of the flexible display 230, or a recess or opening may be formed in a support member (e.g., a bracket) supporting the flexible display 230. The electronic device 101 may include at least one of a sensor module 238 aligned with the recess or opening, and a camera 236. For example, the first display area 231 may further include the camera 236 capable of obtaining an image from the outside through a part of the first display area 231 and the sensor module 238 generating an electrical signal or a data value corresponding to an external environmental state. According to an embodiment, at least one of the sensor module 238 and the camera 236 may be included on a rear surface of the flexible display 230 corresponding to the first display area 231 or the second display area 232 of the flexible display 230. For example, at least one of the camera 236 and the sensor module 238 may be disposed under the flexible display 230 and surrounded by the flexible display 230. At least one of the camera 236 and the sensor module 238 may be surrounded by the flexible display 230 and may not be exposed to the outside. However, it is not limited thereto, and the flexible display 230 may include an opening exposing the camera 236 and the sensor module 238 to the outside. Although not shown in FIGS. 2A and 2B, in an embodiment, the flexible display 230 may further include a rear surface opposite to the front surface. In an embodiment, the flexible display 230 may be supported by a first support member 270 of the first housing 210 and a second support member 280 of the second housing 220.

In an embodiment, the hinge structure 260 may be configured to rotatably connect the first support member 270 forming the first housing 210 and the second support member 280 forming the second housing 220.

In an embodiment, a hinge cover surrounding the hinge structure 260 may be exposed at least partially through the first housing 210 and the second housing 220 while the electronic device 101 is in a folded state. In another embodiment, the hinge cover 265 may be covered by the first housing 210 and the second housing 220 while the electronic device 101 is in an unfolded state.

In an embodiment, the electronic device 101 may be folded with respect to a folding axis 237 passing the hinge cover 265. The hinge cover 265 may be disposed between the first housing 210 and the second housing 220 of the electronic device 101 to bend, curve, or fold the electronic device 101. For example, the first housing 210 may be connected to the second housing 220 through the hinge structure 260 mounted on the hinge cover 265, and may rotate with respect to the folding axis 237.

In an embodiment, the electronic device 101 may be folded so that the first housing 210 and the second housing 220 face each other by rotating with respect to the folding axis 237. In an embodiment, the electronic device 101 may be folded so that the first housing 210 and the second housing 220 may be stacked or overlapped each other.

Referring to FIG. 2C, the electronic device 101 may include the first support member 270, the second support member 280, the hinge structure 260, the flexible display 230, a printed circuit board 250, a battery 255, the hinge cover 265, and a display panel 235. According to an embodiment, the electronic device 101 may omit at least one of components, or may additionally include another component. At least one of the components of the electronic device 100 may be the same or similar to at least one of the components of the electronic device 101 of FIG. 1, 2A, or 2B, and redundant descriptions will be omitted below.

The first housing 210 may include the first support member 270 and the second support member 280. The first support member 270 may be partially surrounded by the first side surface 213, and the second support member 280 may be partially surrounded by the second side surface 223. The first support member 270 may be integrally formed with the first side surface 213, and the second support member 280 may be integrally formed with the second side surface 223. According to an embodiment, the first support member 270 may be formed separately from the first side surface 213, and the second support member 280 may be formed separately from the second side surface 223. The first side surface 213 and the second side surface 223 may be formed of a metal material, a non-metal material, or a combination thereof, and may be used as an antenna.

A surface of the first support member 270 may be coupled with the flexible display panel 230, and another surface may be coupled with a rear plate. A surface of the second support member 280 may be coupled with the flexible display panel 230, and another surface may be coupled with the display panel 235.

The printed circuit board 250 and the battery 255 may be disposed between a surface formed by the first support member 270 and the second support member 280 and a surface formed by the display panel 235 and the rear plate. The printed circuit board 250 may be separated, in order to be disposed on each of the first support member 270 of the first housing 210 and the second support member 280 of the second housing 220. Shapes of a first printed circuit board 251 disposed on the first support member 270 and a second printed circuit board 252 disposed on the second support member 280 may be different from each other according to a space inside the electronic device. Components for implementing various functions of the electronic device 10 may be mounted on the first printed circuit board 251 and the second printed circuit board 252. According to an embodiment, components for implementing the overall functions of the electronic device 101 may be mounted on the first printed circuit board 251, and electronic components for implementing some functions of the first printed circuit board 251 or components for driving the display panel 235 disposed on the fourth surface 222 may be disposed on the second printed circuit board 252. The first printed circuit board 251 and the second printed circuit board 252 may be electrically connected by a flexible printed circuit board 240.

The battery 255 may be a device, for example, for supplying power to at least one component of the electronic device 101, and may include, for example, a non-rechargeable primary battery, a rechargeable secondary battery, or a fuel cell. At least a part of the battery 255 may be disposed on substantially the same plane as the printed circuit board 250. A surface of the printed circuit board 250 and the battery 255 formed substantially in the same plane may be disposed on a surface (e.g., the second surface 212 and the fourth surface 222 or a surface facing the display panel 235 and the rear plate) of the first support member 270 and the second support member 280. For example, the flexible display 230 may be disposed on the first surface 211 and the third surface 221, and the printed circuit board 250 and the battery 255 may be disposed on the second surface 212 and the fourth surface 222 facing a surface on which the flexible display 230 is disposed.

Hereinafter, even when reference to drawing numbers is omitted for components referring to quotation marks for convenience of explanation, it should be noted that the drawing in which the quotation mark is drawn is referred to as an example and is not limited to an example of the drawing.

Figure 3A:
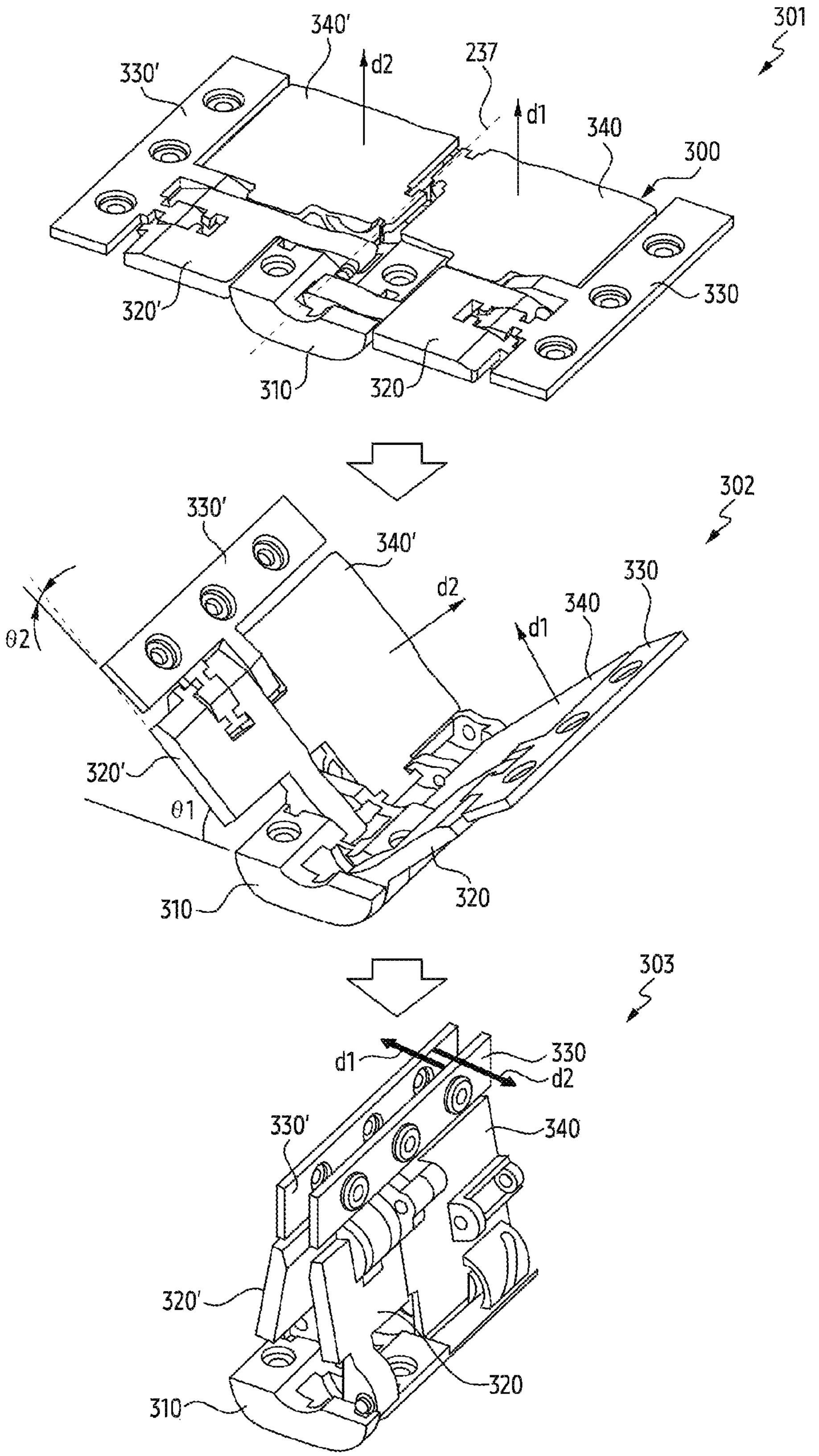
FIG. 3A illustrates an operation of a hinge structure of an electronic device, according to an embodiment.
Figure 3B:
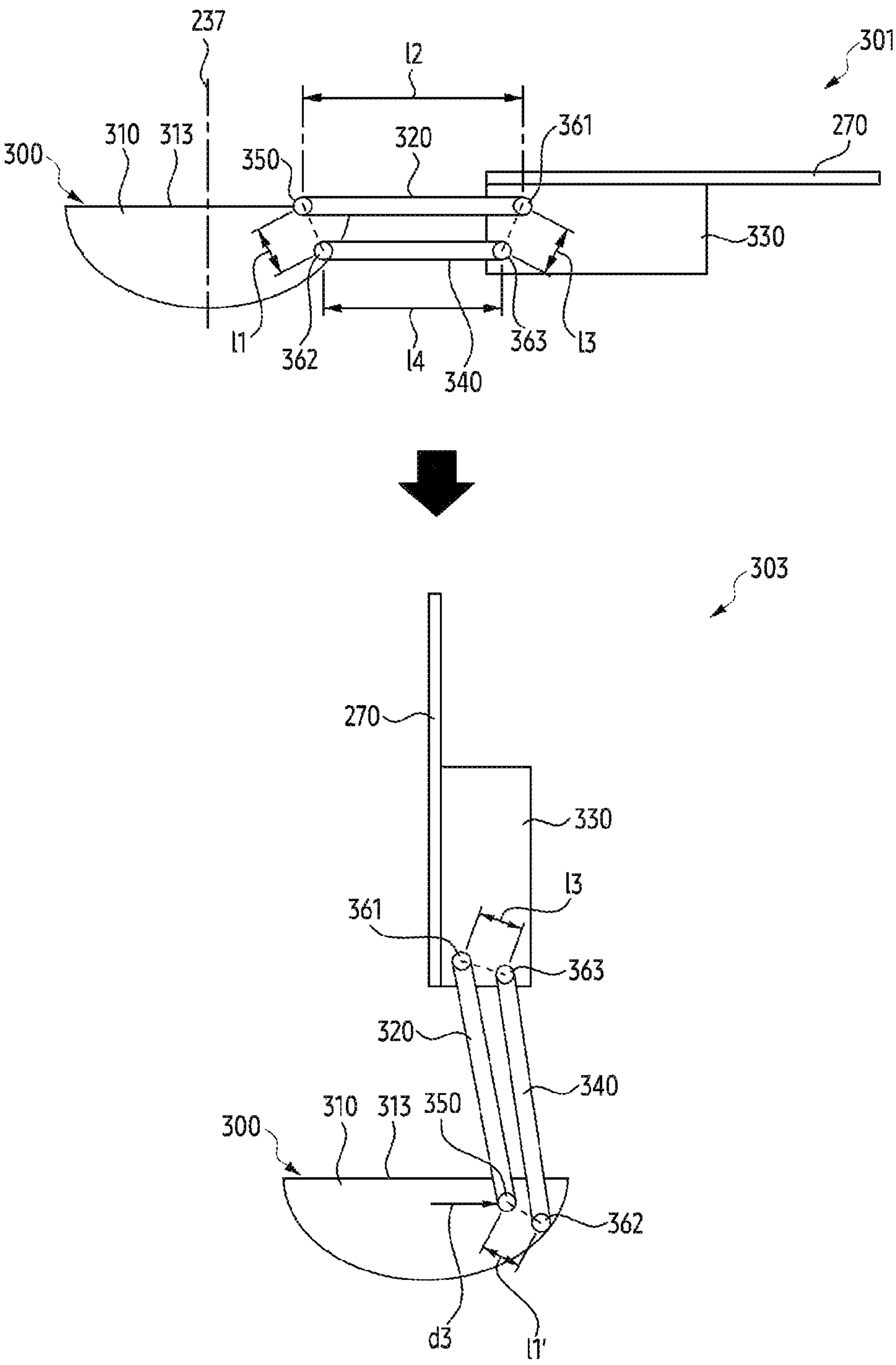
FIG. 3B is a schematic diagram indicating a coupling relationship of a hinge structure of an electronic device, according to an embodiment.
Figure 3C:
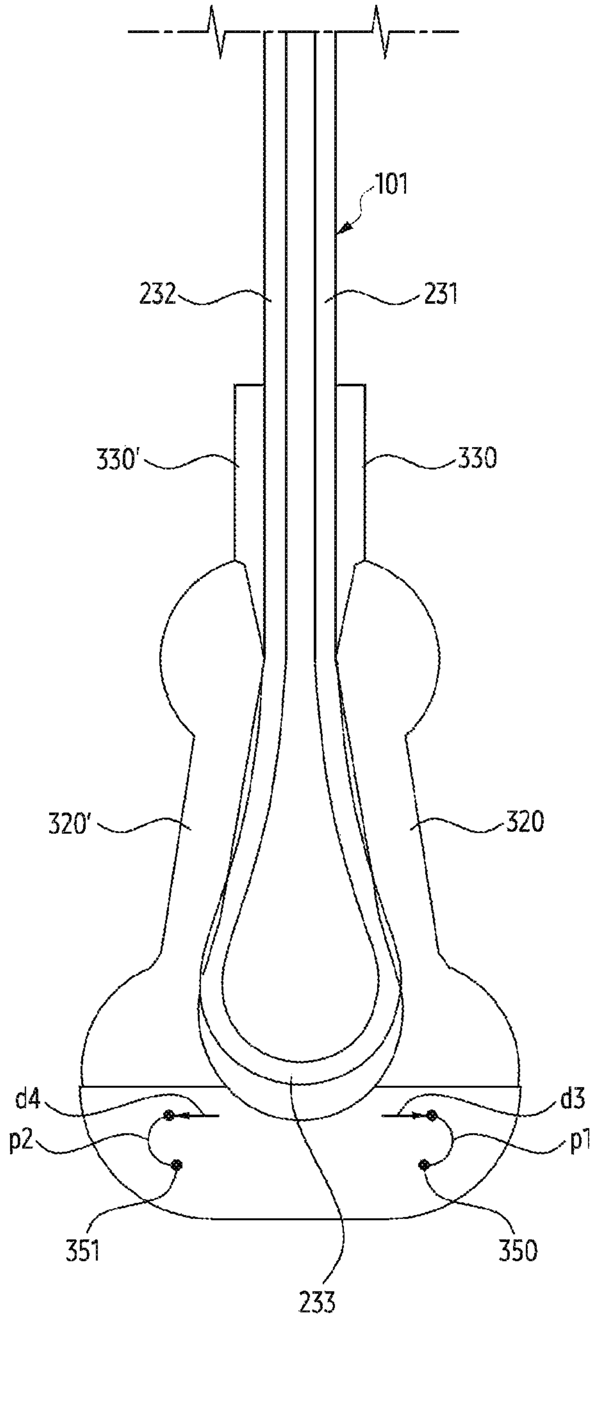
FIG. 3C illustrates a position of a variable rotation axis of a first rotating plate in a folded state of an electronic device, according to an embodiment.

FIG. 3A illustrates an operation of a hinge structure of an electronic device, according to an embodiment, and FIG. 3B is a schematic diagram indicating a coupling relationship of a hinge structure of an electronic device, according to an embodiment, and FIG. 3C illustrates a position of a variable rotation axis of a first rotating plate in a folded state of an electronic device, according to an embodiment.

Referring to FIGS. 3A and 3B, a hinge structure 300 (e.g., the hinge structure 260 of FIG. 2) may include a body 310, a first rotating plate 320, a second rotating plate 330, and a third rotating plate 340.

The hinge structure 300 may pivotably connect a first housing (e.g., the first housing 210 of FIG. 1) and a second housing (e.g., the second housing 220 of FIG. 1) of an electronic device (e.g., the electronic device 101 of FIG. 1).

According to an embodiment, the body 310 may face a third display area 233 of a flexible display 230. The body 310 may be disposed to overlap a folding axis 237 of the flexible display 230. The body 310 may be coupled to a plurality of rotating plates. The body 310 may be pivotably connected to the first rotating plate 320 and the third rotating plate 340. According to an embodiment, the first rotating plate 320 may have a rotation axis different from the third rotating plate 340. For example, a variable rotation axis 350 of the first rotating plate 320 pivotably connected to the body 310 may be spaced apart from a second rotation axis 362 of the third rotating plate 340 pivotably connected to the body 310, and may be parallel to the second rotation axis 362 of the third rotating plate 340 pivotably connected to the body 310.

According to an embodiment, an end of the first rotating plate 320 may be pivotably connected to the body 310, and another end of the first rotating plate 320 may be pivotably connected to the second rotating plate 330. The first rotating plate 320 may be pivotably connected to the second rotating plate 330 through the first rotation axis 361.

According to an embodiment, an end of the third rotating plate 340 may be pivotably connected to the body 310, and another end of the third rotating plate 340 may be pivotably connected to the second rotating plate 330. The third rotating plate 340 may be pivotably connected to the second rotating plate 330 through the third rotation axis 363.

The second rotating plate 330 may support the first support member 270. For example, the first support member 270 may be disposed on a surface of the second rotating plate 330 facing the flexible display 230. The first support member 270 coupled with the second rotating plate 330 may rotate with respect to the folding axis 237 by a rotation of the second rotating plate 330. The hinge structure 300 may switch the electronic device from an unfolded state 301 to a folded state 303, by rotating the first support member 270 and the second support member 280. For example, the second rotating plate 330 may be fastened to the first support member 270, and the first support member 270 may support the first housing 210. Another second rotating plate 330', which is symmetrical the second rotating plate 330 with respect to the folding axis 237, may be fastened to the second support member 280, and the second support member 280 may support the second housing 220. The first housing 210 may rotate with respect to the folding axis by the second rotating plate 330, and the second housing 220 may rotate with respect to the folding axis by the other second rotating plate 330. The first housing 210 may rotate with respect to the second housing 220.

According to an embodiment, the hinge structure 300 may arrange a plurality of rotating plates connected to the body 310 to be symmetrical with respect to the folding axis 237. For example, the hinge structure 300 may have a plurality of rotating plates 320' and 340' corresponding to the first rotating plate 320 and the third plate 340 that are pivotably disposed on a side of the body 310. The first rotating plate 320 and the third rotating plate 340 may be symmetrical the plurality of rotating plates 320' and 340' corresponding to the first rotating plate 320 and the third plate 340 with respect to the folding axis 237. Rotation axes of the first rotating plate 320 and the third plate 340 may be symmetrical to rotation axes of the plurality of rotating plates 320' and 340' corresponding to the first rotating plate 320 and the third rotating plate 340 with respect to the folding axis 237. The second rotating plate 330 pivotably connected to each of the first rotating plate 320 and the third rotating plate 340 may be symmetrical to the other second rotating plate 330' corresponding to the second rotating plate 330 with respect to the folding axis 237. The second rotating plate 330 may be fastened to the first support member 270, and the other second rotating plate 330' corresponding to the second rotating plate 330 may be fastened to the second support member 280.

The unfolded state 301 may be a state in which a direction d1 in which a first display area (e.g., the first display area 231 of FIG. 2A) of the flexible display 230 faces is the same as a direction d2 in which a second display area (e.g., the second display area 232 of FIG. 2A) of the flexible display 230 faces. For example, the first direction d1 in which a plane formed by the second rotating plate 330 connected to the first support member 270 supporting the first display area 231, the first rotating plate 320 connected to the second rotating plate 330, and the third rotating plate 340 faces may be the same as the second direction d2 in which a plane formed by the other second rotating plates 320' corresponding to the second rotating plates 320 connected to the second support member 280 (e.g., the second support member 280 of FIG. 2C)) supporting the second display area 232 and the rotating plates 320' and 340' connected to the other second rotating plate 330' faces.

In the unfolded state 301, surfaces of the first rotating plate 320, the second rotating plate 330, and the third rotating plate 340 may be formed substantially as a single plane. For example, a surface of the first rotating plate 320 facing the flexible display 230, a surface of the second rotating plate 330 facing the flexible display 230, and a surface of the third rotating plate 340 facing the flexible display 230 may be formed substantially as a plane. Surfaces of the plurality of plates 320', 330', and 340', which correspond to the first rotating plate 320, the second rotating plate 330, and the third rotating plate 340, facing the flexible display 230 may be substantially formed as a plane. According to an embodiment, surfaces facing the flexible display 230 of the first rotating plate 320, the second rotating plate 330, the third rotating plate 340, and the plurality of plates 320', 330', and 340' corresponding to the first rotating plate 320, the second rotating plate 330, and the third rotating plate 340 may be substantially formed as a plane.

The folded state 303 may be a state in which the first display area 231 and the second display area 232 face each other. The folded state 303 may be a state in which a direction d1 in which the first display area 231 faces and a direction d2 in which the second display area 232 faces are opposite to each other. For example, the second rotating plate 330 connected to the first support member 270 supporting the first display area 231 and the other second rotating plate 330' corresponding to the second rotating plate 330 connected to the second support member 280 supporting the second display area 232 may face each other. A second direction d1 in which the second rotating plate 330 faces and a direction d2 in which the other second rotating plate 330' corresponding to the second rotating plate 330 face each other may be opposite to each other.

According to an embodiment, in the folded state 303, the first rotating plate 320, the second rotating plate 330, and the third rotating plate 340 may be configured such that the third display area 233 of the flexible display 230 includes a curved surface when the flexible display 230 is folded. For example, in the folded state 303, as the first rotating plate 320 has a slope with respect to a surface 313 facing the flexible display 230 of the body 310, the third display area 233 of the flexible display 230 may have a curved surface. The first rotating plate 320 may have a slope relative to the second rotating plate 330. Since the first rotating plate 320 has an angle with respect to the second rotating plate 330, the flexible display 230 may have a curved surface in an area in which the third display area 233 and the first display area 231 contact each other. The third rotating plate 340 may have a slope relative to the second rotating plate 330. According to an embodiment, a surface formed by the first rotating plate 320 and the third rotating plate 340 may have a slope relative to a surface formed by the second rotating plate 330. For example, the third display area 233 supported by the first rotating plate 320 and the third rotating plate 340 may have a slope based on the first display area 231 supported by the second rotating plate 330. Since the first display area 231 has a slope based on the third display area 233, the flexible display 230 may include a curved surface in which the first display area 231 and the third display area 2330 contact each other, in the folded state 303.

In the folded state 303, surfaces of the plurality of plates 320', 330', and 340', which correspond to the first rotating plate 320, the second rotating plate 330, and the third rotating plate 340, facing the flexible display 230 may include a curved surface. According to an embodiment, the other first rotating plate 320' corresponding to the first rotating plate 320 may have a slope with respect to the other second rotating plate 330' corresponding to the second rotating plate 330. The other third rotating plate 340' corresponding to the third rotating plate 340 may have a slope with respect to the other second rotating plate 330' corresponding to the second rotating plate 330. According to an embodiment, a surface formed by the other first rotating plate 320' corresponding to the first rotating plate 320 and the other third rotating plate 340' corresponding to the third rotating plate 340 may have a slope with respect to a surface formed by the other second rotating plate 330' corresponding to the second rotating plate 330. As the other first rotating plate 320' has an angle based on the other second rotating plate 330', the flexible display 230 may have a curved surface in an area in which the third display area 233 and the second display area 232 contact each other. For example, the third display area 233 supported by the other first rotating plate 320' and the other third rotating plate 340' may have a slope with respect to the second display area 232 supported by the other second rotating plate 330'. Since the second display area 232 has a slope with respect to the third display area 233, a surface in which the second display area 232 and the third display area 233 contact each other may be a curved surface.

According to an embodiment, the first rotating plate 320 and the third rotating plate 340 may rotate by 90 degrees or more from the body 310 when switching from the unfolded state 301 to the folded state 303. For example, in the folded state 303, the surface 313 facing the flexible display 230 of the body 310 may form an obtuse angle with the first rotating plate 320 and the third rotating plate 340. In the folded state 303, the second rotating plate 330 may be perpendicular to the surface 313 of the body 310. Rotating plates 320' and 340' corresponding to the first rotating plate 320 and the third rotating plate 340 may rotate by 90 degrees or more from the body 310 when switching from the unfolded state 301 to the folded state 303. In the folded state 303, the second rotating plate 330 may be perpendicular to the surface 313 of the body 310.

According to an embodiment, the electronic device 101 may undergo a transient state 302 switched from the unfolded state 301 to the folded state 303. In the transient state 302, a first direction d1 in which the first display area 231 faces and a second direction d2 in which the second display area 232 faces may be different. For example, in the transient state 302, a line extending in the first direction d1 may intersect a line extending in the second direction d2.

According to an embodiment, in the transient state 302, when the flexible display 230 is switched from the unfolded state 301 to the folded state 303, the first rotating plate 320, the second rotating plate 330, and the third rotating plate 340 may be configured such that a surface of the flexible display 230 includes a curved surface. For example, in the transient state 302, the third display area 233 of the flexible display 230 may have a curved surface. Since the first rotating plate 320 has an angle based on the second rotating plate 330, the flexible display 230 may have a curved surface in an area in which the third display area 233 and the first display area 231 contact each other. According to an embodiment, the other first rotating plate 320' corresponding to the first rotating plate 320 may have a slope with respect to the other second rotating plate 330' corresponding to the second rotating plate 330. The other third rotating plate 340' corresponding to the third rotating plate 340 may have a slope with respect to the other second rotating plate 330' corresponding to the second rotating plate 330. For example, the first rotating plate 320 or the third rotating plate 340 may rotate at an angle Θ1 based on the surface 313 facing the flexible display 230 of the body 310, respectively. The second rotating plate 330 pivotably connected to each of the first rotating plate 320 or the third rotating plate 340 may be inclined with respect to the first rotating plate 320 and/or the third rotating plate 340. A rotation angle of the second rotating plate 330 based on the surface 313 facing the flexible display 230 of the body 310 may be less by an angle Θ2 than a rotation angle of the first rotating plate 320 and/or the third rotating plate 340 based on the surface 313 of the body 310. For example, the first rotating plate 320 or the other first rotating plate 320' may rotate at an angle Θ1 based on the body 310. The third rotating plate 340 or the other third rotating plate 340' may rotate at an angle corresponding to the angle Θ1 based on the body 310. When the first rotating plate 320 rotates at the angle Θ1 based on the body 310, the third rotating plate 340 may rotate at an angle corresponding to the angle Θ1 according to the rotation angle Θ1 of the first rotating plate 320. For example, since the first rotating plate 320 rotates and moves away from the folding axis at the same time, a rotation angle of the first rotating plate 320 and a rotation angle of the third rotating plate 340 may be different. In the transient state 302, when the second rotating plate 330 and the first rotating plate 320 fastened to the flexible display 230 rotate on a fixed rotation axis, a display may be compressed in some states of switching from the unfolded state to the folded state. In a folding process, the flexible display 230 may be moved toward a periphery of the first housing 210 far from the folding axis 237 and a periphery of the second housing 220 far from the folding axis 237, among peripheries of the first housing 210 or the second housing 220. In the folding process, since a part of the flexible display 230 is attached to the first housing 210 and the second housing 220, the flexible display 230 may not move sufficiently, and the flexible display 230 may be compressed in some areas in which sufficient movement does not occur. Since a rotating plate having a fixed rotation axis does not provide a sufficient moving distance to the flexible display 230, a compressive force may be applied to the flexible display 230. Buckling may occur in a section in which the flexible display 230 is compressed, by the compressive force applied to the flexible display 230. The buckling may be a shape in which deformation occurs in a direction perpendicular to a compression direction when a pressure greater than or equal to a reference is applied to an object to be compressed, and deformation is maintained even when the pressure is removed. For example, when switching from the unfolded state 301 to the folded state 303, a compressive force may be applied to the flexible display 230 by rotating plates, and the flexible display 230 may be deformed by the applied compressive force. When stress is accumulated by a compressive force applied by rotating plates to the flexible display 230, or when a compressive force greater than or equal to a threshold is applied, the deformed flexible display 230 may not be restored to its original shape and may remain in a deformed state. The flexible display 230 may be lifted from the first housing 210, the second housing 220, or the hinge structure 300 due to the deformed state. In order to prevent deformation of the flexible display described above, when the electronic device 101 is switched from the unfolded state 301 to the folded state 303, a rotation axis of a rotating plate switching a state of the flexible display 230 may be varied.

Referring to FIGS. 3B and 3C, according to an embodiment, the hinge structure 300 may have a plurality of rotation axes that connect pivotably and mutually the body 310 and a plurality of rotating plates 320, 330, 340, 320', 330', and 340'.

The first rotating plate 320 may pivot based on the body 310 by the variable rotation axis 350 at an end, and pivot based on the second rotating plate 330 by the first rotation axis 361 at another end. The variable rotation axis 350 may be an axis that is movable while the first rotation plate 320 rotates based on the body 310. The variable rotation axis 350 may be a rotation axis in which the first rotating plate 320 rotates and moves along a plurality of paths formed on the body 310. For example, the variable rotation axis 350 may connect the body 310 and the first rotating plate 320. When the first rotating plate 320 rotates based on the variable rotation axis 350, the variable rotation axis 350 may move toward a third direction d3. When the other first rotating plate 320' corresponding to the first rotating plate 320 rotates based on the variable rotation axis 351, the variable rotation axis 351 may move toward a fourth direction d4.

In the transient state 302 of the electronic device 101, the first rotating plate 320 may move toward a periphery far from the folding axis 237 among the peripheries of the first housing 210 by the rotation axis 350 moving in the third direction d3. In the transient state 302 of the electronic device 101, the other first rotating plate 320' corresponding to the first rotating plate 320 may move toward a periphery far from the folding axis 237 among the peripheries of the second housing 220 by the variable rotation axis 351 moving in the fourth direction d4. In the transient state 302, a distance between the variable rotation axis 350 of the first rotating plate 320 and the rotation axis 351 of the other first rotating plate 320' corresponding to the first rotating plate 320 may become distant and then become closer. For example, the variable rotation axis 350 in which the first rotating plate 320 rotates based on the body 310 may move along a path p1. The variable rotation axis 351 in which the other first rotating plate 320' corresponding to the first rotating plate 320 rotates based on the body 310 may move along a path p2. The path p1 and the path p2 may be symmetrical to each other with respect to the folding axis 237. In the transient state switched from the unfolded state 301 to the folded state 303, the path p1 may include a curved path that moves toward the outside of the body 310 and then moves into the inside of the body 310. For example, the first rotating plate 320 rotating and moving along the path p1 may move in the third direction d3 away from the folding axis 237 and then move in a direction opposite to the third direction d3. The path p1 may be formed as a curved path such as an arc, but is not limited thereto, and the path p1 may be formed as a path having various shapes such as a path reciprocating on a straight line.

The second rotating plate 330 may be pivotably connected to the first rotating plate 320 with respect to the first rotation axis 361, and may be pivotably connected to the third rotating plate 340 with respect to the third rotation axis 363. The third rotating plate 340 may be pivotably connected to the body 310 with respect to the second rotation axis 362, and may be pivotably connected to the second rotating plate 330 with respect to the third rotation axis 363.

According to an embodiment, the variable rotation axis 350 may be a variable axis, and the first rotation axis 361, the second rotation axis 362, and the third rotation axis 363 may be a fixed axis. For example, the variable rotation axis 350 may move along a designated path (e.g., the path p1 or the path p2) formed in the body 310 and pivotably connect a designated position of the first rotating plate 320. The first rotation axis 361 may pivotably connect a designated position of the first rotating plate 320 and a designated position of the second rotating plate 330. The second rotation axis 362 may pivotably connect a designated position of the body 310 and a designated position of the third rotating plate 340. The third rotation axis 363 may pivotably connect the designated position of the second rotating plate 330 and the designated position of the third rotating plate 340.

According to an embodiment, in the transient state 302 in which a state of the flexible display 230 of the electronic device 101 changes, based on the body 310, a distance l1 between a position of the variable rotation axis 350 determined by a structure enabling the first rotating plate 320 to pivot with respect to the variable rotation axis 350 rotating or moving along a moving path (e.g., the path p1 or path p2) and a structure enabling the third rotating plate 340 to pivot may be changed by a change in the position of the variable rotation axis 350.

In the transient state 302, a distance l2 between a pin pivotably connected with respect to the variable rotation axis 350 located at a point of the first rotating plate 320 and another pin that is distinct from the pin and enables pivoting with respect to the first rotation axis 361 located at another point distinct from the point where the pin of the first rotating plate 320 is located may be constant. For example, a distance between the first rotation axis 361 and the variable rotation axis 350 may be constant. In the transient state 302, a distance l3 between a structure that enables pivoting with respect to the first rotation axis 361 located at a point of the second rotating plate 330 and a structure that enables pivoting with respect to the third rotation axis 363 located at another point distinct from the point of the second rotating plate 330 may be constant. In the transient state 302, a distance l4 between a structure that enables pivoting with respect to the second rotation axis 362 located at a point of the third rotating plate 340 and a structure that enables pivoting with respect to the third rotation axis 363 located at another point distinct from the point of the third rotating plate 340 may be constant.

According to an embodiment, the distance l1 between the variable rotation axis 350 and the second rotation axis 362 in the unfolded state 301 may be changed to a distance l1' between the variable rotation axis 350 and the second rotation axis 362 in the folded state 303. As the variable rotation axis 350 moves along the designated path p1, the first rotating plate 320, the second rotating plate 330, and the third rotating plate 340 may rotate along a designated path.

According to an embodiment, the flexible display 230 may be supported by the first rotating plate 320 having the variable rotation axis 350, the variable rotation axis 350 moving along the path p1 formed in the body to pivotably connect with a side of the body 310, the third rotating plate 340 pivotably connected to a side of the body 310, and the second rotating plate 330 pivotably connected to each of the first rotating plate 320 and the third rotating plate 340, supporting the first housing 210, and having a slope with respect to the first rotating plate 320 in the folded state 303 of the electronic device 101 in which the first direction d1 in which the first display area 231 faces is different from the second direction d2 in which the second display area 232 faces. In the folded state 303, as each of the first rotating plate 320 and the other first rotating plate 320' corresponding to the first rotating plate 320 are arranged to have a slope with each of the third rotating plate 340 and the third rotating plate 340' corresponding to the third rotating plate 340, the flexible display 230 may have a water drop shape or a dumbbell shape. For example, when the electronic device 101 is switched from the unfolded state 301 to the folded state 303, the first rotating plate 320 and the third rotating plate 340 may rotate by 90 degrees or more from the surface 313 facing the display of the body 310, and the second rotating plate 330 may rotate by 90 degrees from the surface 313 facing the display of the body 310. The second rotating plate 330 and the other rotating plate 330' corresponding to the second rotating plate 330 may be disposed parallel to each other. The first display area 231 and the second display area 232 of the flexible display 230 that is supported by the first support member 270 supported by the second rotating plate 330 and the second support member 280 supported by the other second rotating plate 330' corresponding to the second rotating plate 330 may be disposed parallel to each other. For example, a distance between the first display area 231 and the second display area 232 may be maintained the same.

An interval between a point in contact with the second rotating plate 330 of the first rotating plate 320 and a point in contact with the other second rotating plate 330' corresponding to the second rotating plate 330 of the other first rotating plate 320' corresponding to the first rotating plate 320' may be smaller than an interval between a point in contact with the body 310 of the first rotating plate 320 and a point in contact with the body 310 of the other first rotating plate 320' corresponding to the first rotating plate 320. As the first rotating plate 320 faces toward the body 310, the first rotating plate 320 may become farther away from the other first rotating plate 320' corresponding to the first rotating plate 320.

According to an embodiment, the variable rotation axis 350 on which the first rotating plate 320 rotates may be disposed closer to a neutral surface 530 of the flexible display 230 than a rotation axis on which the first rotating plate 320 rotates based on a fixed rotation axis. In order to arrange the variable rotation axis 350 close to the neutral surface 530 of the flexible display 230 while the electronic device 101 changes from the unfolded state 301 to the folded state 303, the variable rotation axis 350 may move along a designated path.

According to the above-described embodiment, as the first rotating plate 320 rotates along the variable rotation axis 350, a plurality of rotating plates 320, 330, 340, 320', 330', and 340' may rotate along a designated path, in the hinge structure 300. Since the hinge structure 300 may increase a gap between corresponding rotating plates by moving the rotating plates 320, 330, 340, 320', 330', and 340' toward peripheries of the electronic device 101 disposed far based on the folding axis 237 while the electronic device 101 is switched from the unfolded state 301 to the folded state, pressure applied to the flexible display 230 may be reduced. As the pressure applied to the flexible display 230 is reduced, buckling phenomenon of the flexible display 230 may be reduced or prevented.

Figure 4:
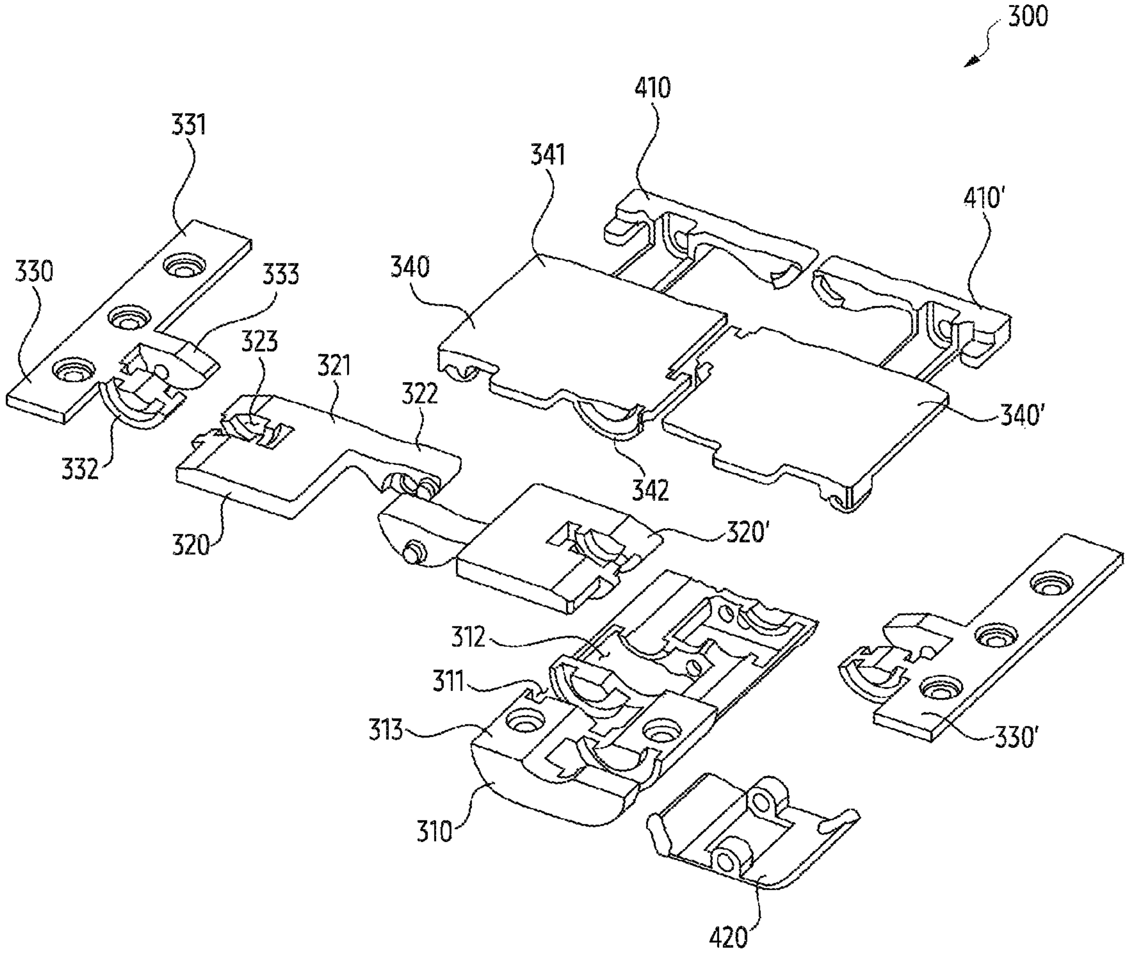
FIG. 4 is an exploded view of a hinge structure, according to an embodiment.

FIG. 4 is an exploded view of a hinge structure, according to an embodiment.

Referring to FIG. 4, a hinge structure 300 may include a body 310, a first rotating plate 320, a second rotating plate 330, a third rotating plate 340, and rotating plates 320', 330', and 340' corresponding to each of the first rotating plate 320, the second rotating plate 330, and the third rotating plate 340.

According to an embodiment, the body 310 may be pivotably connected to each of the first rotating plate 320 and the third rotating plate 340. The body 310 may include a first fastening portion 311 into which a connecting portion 322 of the first rotating plate 320 is insertable. The first fastening portion 311 may be formed on a side surface disposed along a periphery of a surface 313 of the body 310 facing the flexible display 230. The first fastening part 311 may be connected to the connecting portion 322 of the first rotating plate 320 to pivotably connect the body 310 and the first rotating plate 320. The first fastening portion 311 may be coupled with the connecting portion 322, and move the connecting portion 322 of the first rotating plate 320 along a designated path to provide a variable rotation axis (e.g., the variable rotation axis 350 of FIG. 3C) to the first rotating plate 320. The first rotating plate 320 may include a first support portion 321 and the connecting portion 322. The first support portion 321 may face a flexible display (e.g., the flexible display 230 of FIG. 2A). A surface of the first support 321 facing the flexible display 230 may be formed to be substantially a plane. The connecting portion 322 of the first rotating plate 320 may extend from a part of a side surface of the first support 321 toward the body 310.

The body 310 may further include a second fastening portion 312 for fastening with the third rotating plate 340. The third rotating plate 340 may include a third support portion 341 and a connecting portion 342 formed of a protrusion. A surface of the third support portion 341 facing the flexible display 230 may be a plane. The connecting portion 342 of the third rotating plate 340 may be disposed on another surface opposite to the surface of the third support portion 341. The second fastening portion 312 may be connected to the connecting portion 342 of the third rotating plate 340. The second fastening portion 312 may be an opening formed in the body 310. The second fastening portion 312 of the body 310 may provide a space for movement of a slider 420 disposed on a rear surface opposite to the surface 313, which is a front surface.

The third rotating plate 340 may be coupled to a cam member 410. The cam member 410 may determine an operating range of the hinge structure 300 by a stopper formed on the body 310. For example, when the electronic device 101 is switched from the folded state 303 to the unfolded state 301, the cam member 410 may be prevented from moving by the stopper of the body 310 and may maintain the unfolded state 301.

According to an embodiment, the second rotating plate 330 may be connected to the first rotating plate 320 and the third rotating plate 340, respectively. The second rotating plate 330 may include a first connecting portion 332 for connecting to the first rotating plate 320 and a second connecting portion 333 for connecting to the third rotating plate 340. The second rotating plate 330 may include a second support portion 331 fastened to a support member (e.g., the first support member 270 and the second support member 280).

Figure 5A:
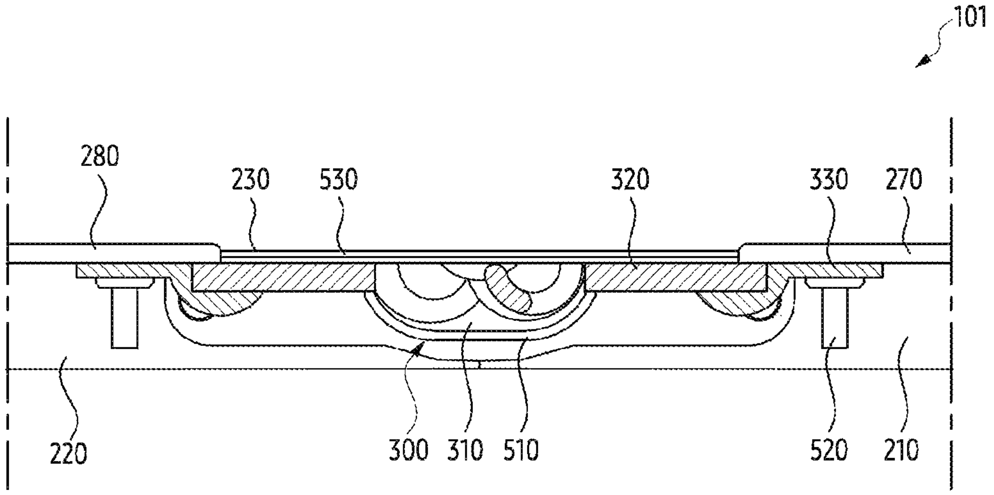
FIG. 5A illustrates an arrangement of a rotating plate in an unfolded state of an electronic device, according to an embodiment.
Figure 5B:
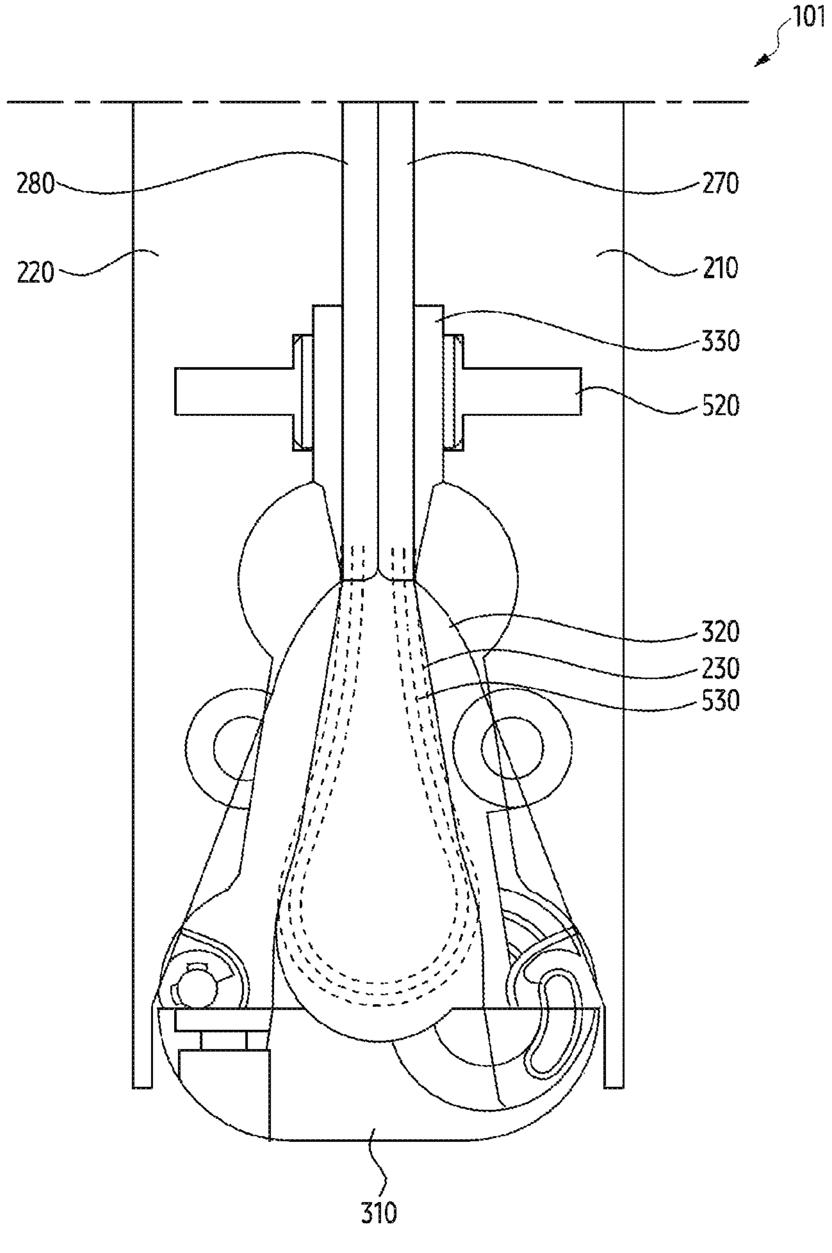
FIG. 5B illustrates an arrangement of a rotating plate in a folded state of an electronic device, according to an embodiment.

FIG. 5A illustrates an arrangement of a rotating plate in an unfolded state of an electronic device, according to an embodiment, and FIG. 5B illustrates an arrangement of a rotating plate in a folded state of an electronic device, according to an embodiment.

Referring to FIGS. 5A and 5B, in the unfolded state 301, a surface facing a flexible display 230 of a body 310, a first rotating plate 320, and a second rotating plate 330 may be formed as a plane.

The electronic device 101 may include a first housing 210, a second housing 220, the flexible display 230 disposed on a first support member 270 of the first housing 210 and the second support member 280 of the second housing 220, and a hinge structure 300 rotatably connecting the first housing 210 and the second housing 220.

The hinge structure 300 may prevent internal components from being exposed to the outside, by a hinge cover 510. The hinge structure 300 may include the body 310 accommodated in the hinge cover 510, the first rotating plate 320 connected to a side surface of the body 310, and a third rotating plate connected to the first rotating plate 330. An end of the first rotating plate 320 may be pivotably connected to the body 310, and another end of the first rotating plate 320 may be pivotably connected to the third rotating plate 330.

The third rotating plate 330 may be coupled to the first support member 270 through a fastening member. The first support member 270 may be disposed inside the first housing 210 to support electronic components (e.g., flexible display, printed circuit board) of the electronic device 101.

In the folded state 303, the hinge cover 510 may be exposed to the outside by a spaced apart end of the first housing 210 and the second housing 220. The first rotating plate 320 may rotate 90 degrees or more from a surface 313 of the body by pivot rotating by the body 310, and the first rotating plate 320 in the folded state 303 may change a third display area 233 of the flexible display 230 into a water drop shape.

In the folded state 303, the first support member 270 and the second support member 280 may face each other. A first display area 231 and a second display area 232 of the flexible display 230 may be supported by the first support member 270 and the second support member 280. The first support member 270 and the second support member 280 may be moved to face each other by the second rotating plate 330 and another second rotating plate 330' corresponding to the second rotating plate 330.

Figure 6A:
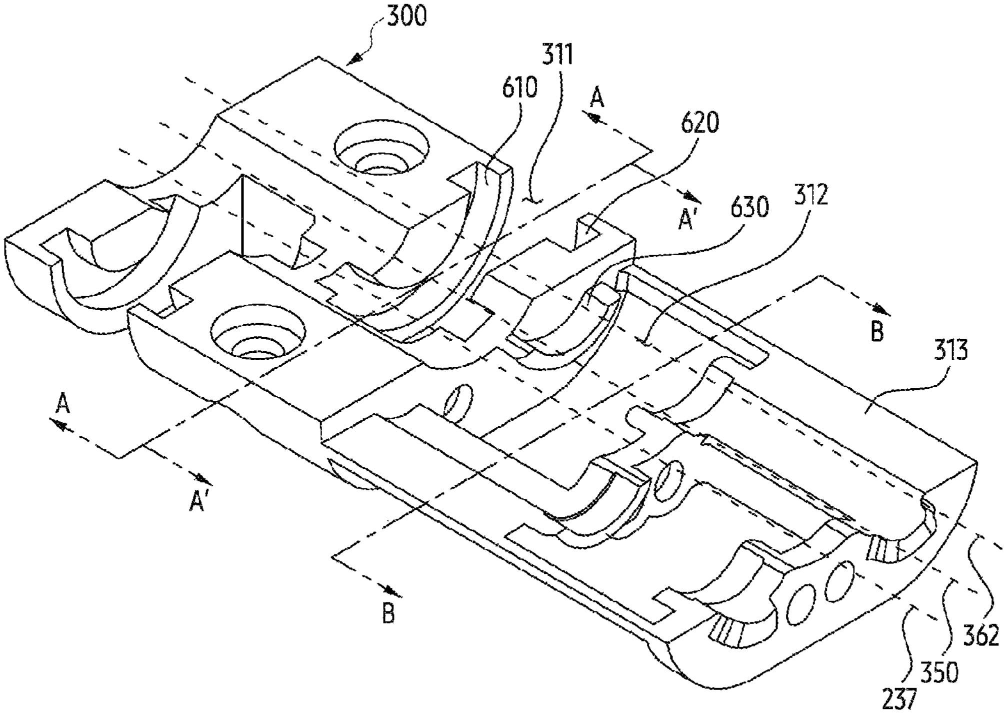
FIG. 6A is a perspective view of a body of a hinge structure, according to an embodiment.
Figure 6B:
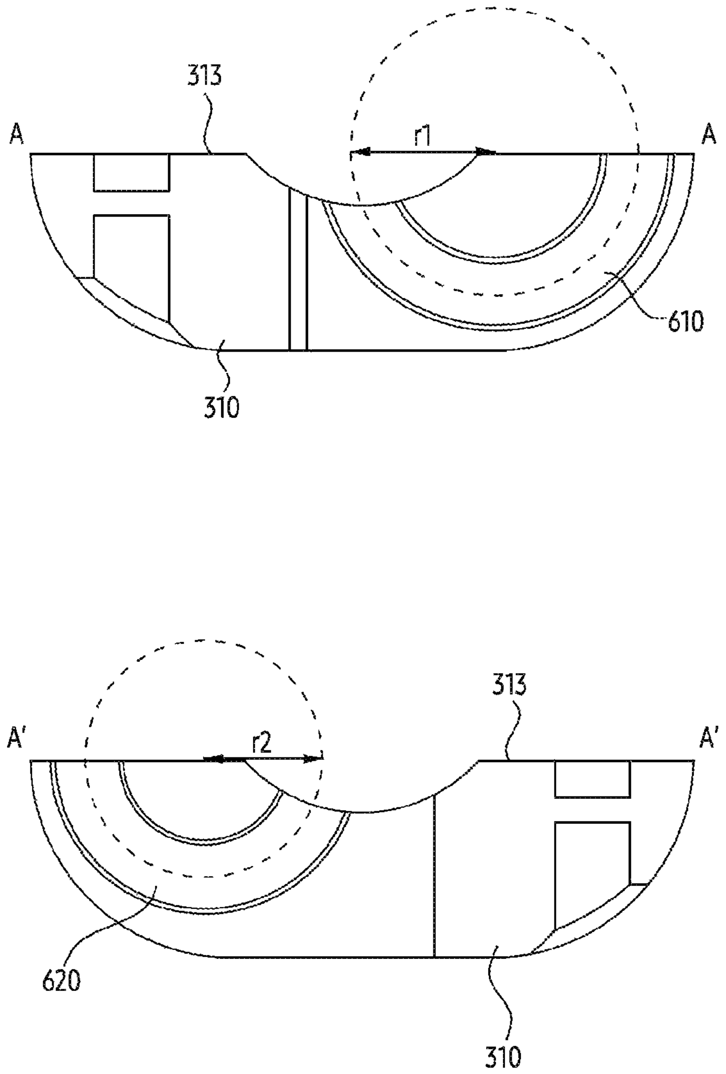
FIG. 6B is a cross-sectional view of the body of FIG. 6A cut along line A-A, according to an embodiment.
Figure 6C:
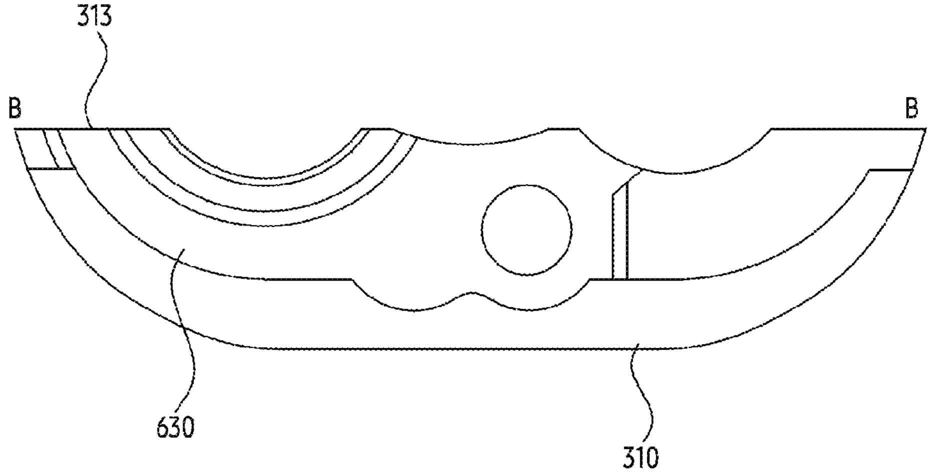
FIG. 6C is a cross-sectional view of the body of FIG. 6A cut along line B-B, according to an embodiment.

FIG. 6A is a perspective view of a body of a hinge structure, according to an embodiment, and FIG. 6B is a cross-sectional view of the body of FIG. 6A cut along line A-A, according to an embodiment, and FIG. 6C is a cross-sectional view of the body of FIG. 6A cut along line B-B, according to an embodiment.

Referring to FIGS. 6A, 6B and 6C, a body 310 may include a structure for coupling with a first rotating plate 320 and a third rotating plate 340. For example, the body 310 may include a first fastening portion 311 forming a variable rotation axis 350 and a second fastening portion 312 forming a second rotation axis 362.

According to an embodiment, the first fastening portion 311 may have a groove dug from a side surface into the body, in order to provide an area in which a connecting portion of the first rotating plate 320 may be inserted and rotatable. The first fastening portion 311 may be pivotably connected to the first rotating plate 320. The first fastening portion may include a plurality of grooves into which pins of the first rotating plate 320 may be inserted.

The first fastening portion 311 of the body 310 may include a first guide groove 610 and a second guide groove 620. The first guide groove 610 may provide a first rotation path, and the second guide groove 620 may provide a second rotation path. One of the pins formed in the first rotating plate 320 may be disposed in the first guide groove 610. Another one of the pins formed in the first rotating plate 320 may be disposed in the second guide groove 620.

According to an embodiment, a radius of the first guide groove 610 and a radius of the second guide groove 620 may be different. The first rotation path formed by the first guide groove 610 may be different from the second rotation path formed by the second guide groove 620. A rotation axis of the first rotation path may be different from a rotation axis of the second rotation path. Since the first rotation path and the second rotation path are formed to be different from each other, a second pin in the second guide groove 620 may be moved along the second rotation path having the second rotation axis while a first pin in the first guide groove 610 moves along the first rotation path.

According to an embodiment, the second fastening portion 312 may include a rail 630 providing a second rotation axis 362 to the third rotating plate 340. The rail 630 may be inserted into a rail groove formed in the third rotating plate 340. As the rail 630 is rotatably coupled to the rail groove formed in the second rotating plate 340, the third rotating plate 340 may pivot based on the body 310.

Figure 7A:
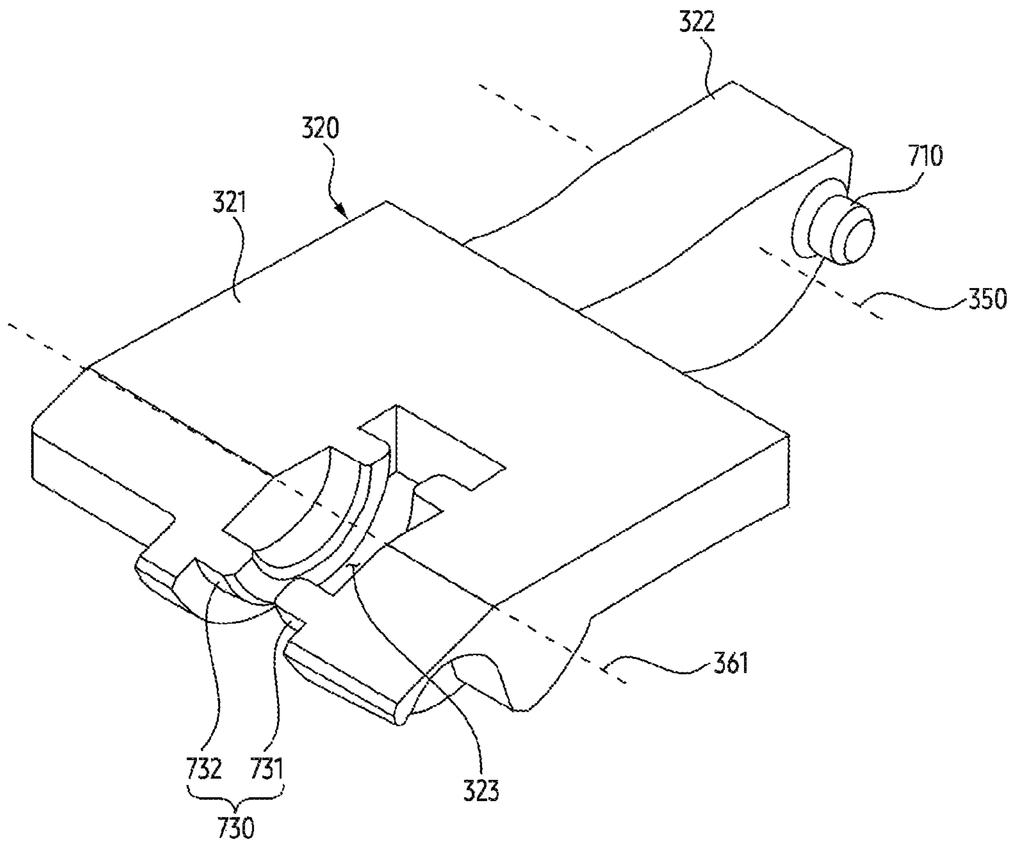
FIG. 7A is a perspective view of a first rotating plate of a hinge structure, according to an embodiment.
Figure 7B:
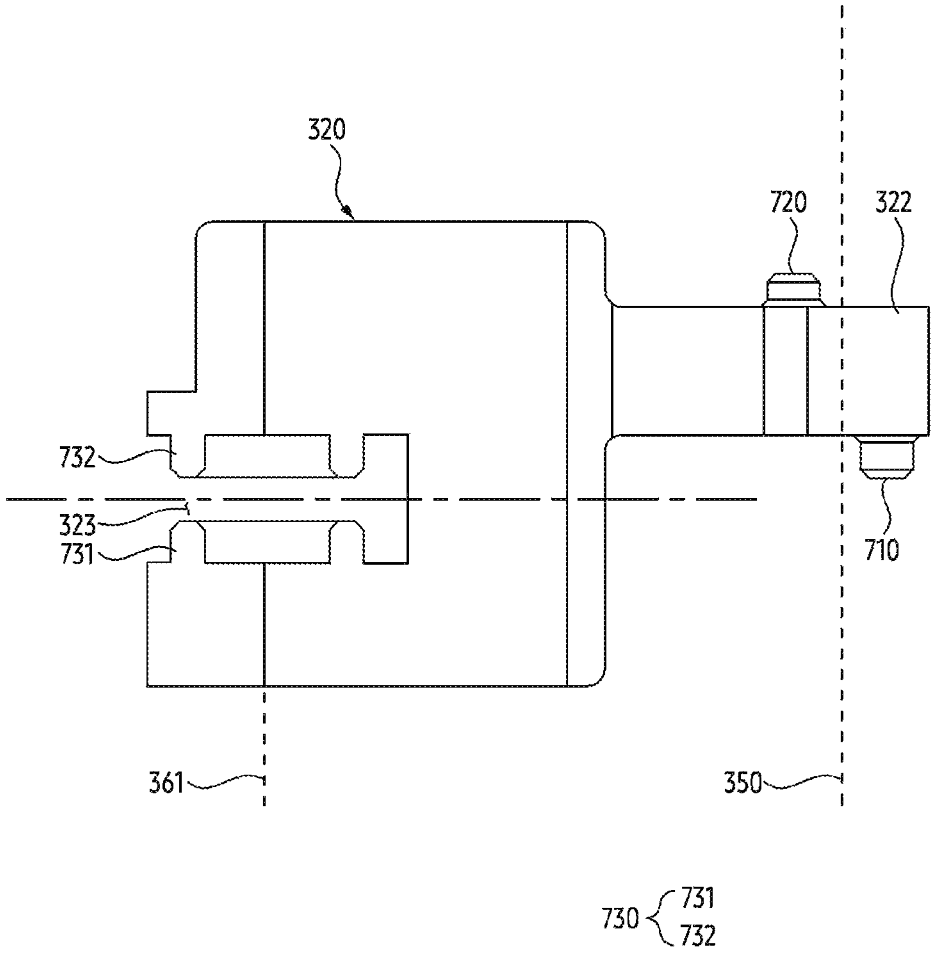
FIG. 7B is a plan view of a first rotating plate of a hinge structure according to an embodiment.
Figure 7C:
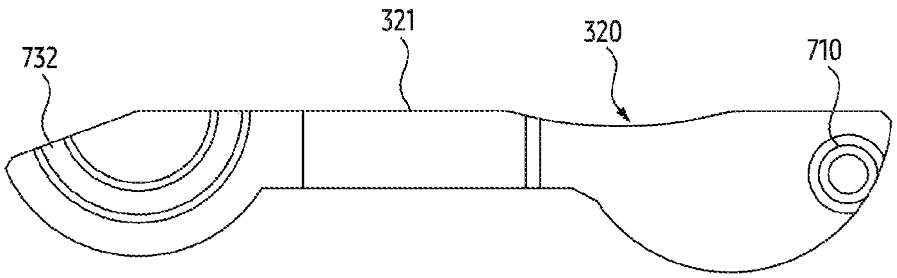
FIG. 7C is a cross-sectional view of the first rotating plate of FIG. 7B cut along line C-C, according to an embodiment.

FIG. 7A is a perspective view of a first rotating plate of a hinge structure, according to an embodiment, and FIG. 7B is a plan view of a first rotating plate of a hinge structure according to an embodiment, and FIG. 7C is a cross-sectional view of the first rotating plate of FIG. 7B cut along line C-C, according to an embodiment.

Referring to FIGS. 7A, 7B, and 7C, a first rotating plate 320 may include a first support portion 321, a connecting portion 322 extending from the first support portion 321 and a fastening portion 323. The first support portion 321 may support a flexible display 230. In an unfolded state 301, the first support portion 321 may form the same plane as a surface formed by support portions of other rotating plates. The connecting portion 322 of the first rotating plate 320 may extend from a side surface of the first support portion 321. As the connecting portion 322 of the first rotating plate 320 is coupled with a first fastening portion 311 of a body 310, the first rotating plate 320 may pivot based on the body 310.

According to an embodiment, the first rotating plate 320 may have a first pin 710 and a second pin 720 protruding from a side surface of the first connecting portion 322. The first pin 710 may protrude from a side surface of the first connecting portion 322, and the second pin 720 may protrude from another side surface opposite to the side surface of the first connecting portion 322. The first pin 710 may be inserted into a first guide groove 610 of the body 310, and the second pin 720 may be inserted into a second guide groove 620 of the body 310. The first pin 710 may rotate along a first rotation path provided by the first guide groove 610, and the second pin 720 may rotate along a second rotation path provided by the second guide groove 620. A rotation axis of the first rotation path in which the first pin 710 moves may be different from a rotation axis of the second rotation path in which the second pin 720 moves. A position of the first pin 710 may be determined according to movement of the second pin 720. For example, since a distance between the first pin 710 and the second pin 720 is fixed, the position of the first pin 710 may be related to a position of the second pin 720. For example, the first rotation path in which the first pin 710 moves and the second rotation path in which the second pin 720 moves may be related to a position of a variable rotation axis 350 of the first rotating plate 320.

According to an embodiment, the fastening portion 323 may include a rail portion 730 for coupling with the second rotating plate 330. The rail portion 730 may be inserted into a rail groove formed in the second rotating plate 330. The rail portion 730 may include a first rail 731 and a second rail 732. The fastening portion 323 may form a groove dug inside the first support portion 321. The rail portion 730 may be disposed on a side surface of a groove formed inside the fastening portion 323. For example, the first rail 731 may protrude from a sidewall of the fastening portion 323 toward another sidewall opposite to the sidewall. The second rail 732 may protrude from the other sidewall of the fastening portion 323 toward the sidewall. The first rail 731 and the second rail 732 may be formed of the same shape. The first rail 731 and the second rail 732 may protrude in a shape forming part of a circle. A center of a circle formed by the first rail 731 may be the same as a center of a circle formed by the second rail 732. According to an embodiment, a line segment connecting the center of the circle formed by the first rail 731 and the second rail 732 may be a first rotation axis 361.

Figure 8:
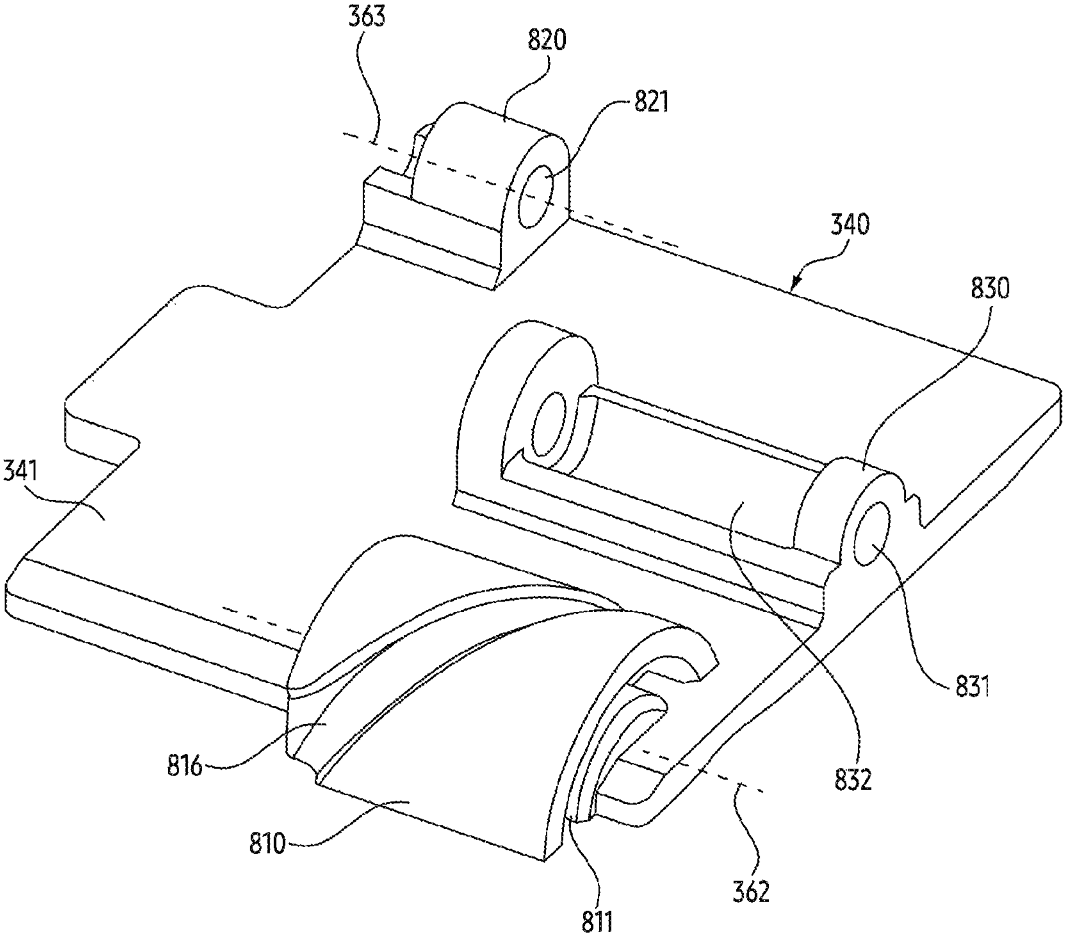
FIG. 8 is a perspective view of a third rotating plate of a hinge structure, according to an embodiment.

FIG. 8 is a perspective view of a third rotating plate of a hinge structure, according to an embodiment.

Referring to FIG. 8, a third rotating plate 340 may include structures for connecting with a third support portion 341, a second rotating plate 330, and a body 310. The third support portion 341 may form a plane with a first support portion 321 of a first rotating plate 320. In an unfolded state 301, the third support portion 341 may form a plane with a second support portion 331 of the second rotating plate 330. In a folded state 303, the third support portion 341 may be inclined based on the second support portion 331 of the second rotating plate 330. The third support portion 341 may have a surface facing the flexible display 230 and another surface opposite to the surface. The second rotating plate 340 may further include a rotating portion 810 in which a rail groove 811 providing a rotation path rotated by a second rotation axis 362 is formed on the other surface of the second support portion 341, a first hinge connecting portion 820 hinge-coupled to the second rotating plate 330, and a cam seating portion 830 in which the cam member 410 is seated. The first hinge connecting portion 820 may pivotably couple the second rotating plate 330 to the third rotating plate 340 based on the third rotation axis 363. The first hinge connecting portion 820 may include a hole 821 into which a hinge pin connected to the second rotating plate 330 is inserted.

According to an embodiment, the cam seating portion 830 may include a seating surface 832 on which a part of the cam member 410 is seated. The cam seating portion 830 may include a through hole 831 formed toward a side surface of the second rotating plate 340. A part of the cam member 410 may pass through the through hole 831, and a cam may be disposed on the side surface of the second rotating plate 340.

Figure 9:
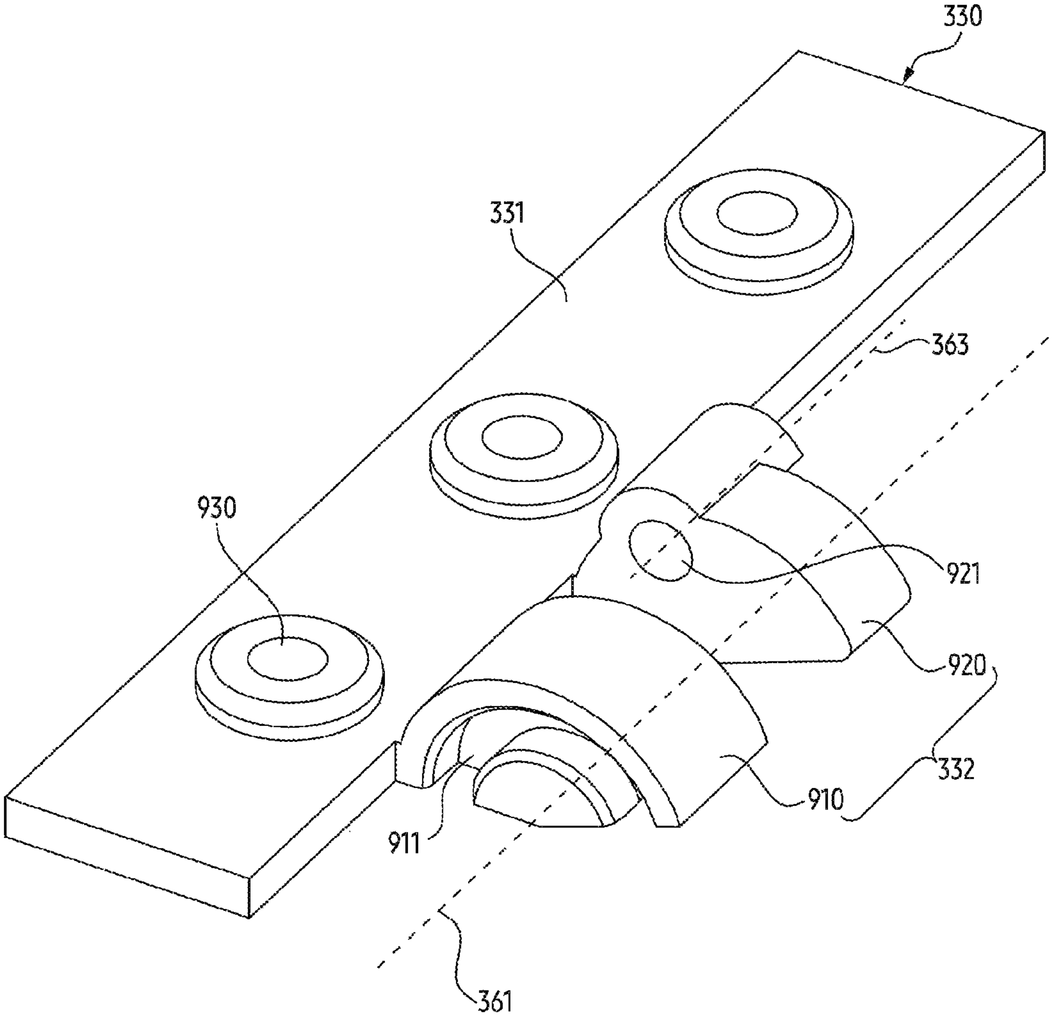
FIG. 9 is a perspective view of a second rotating plate of a hinge structure, according to an embodiment.

FIG. 9 is a perspective view of a second rotating plate of a hinge structure, according to an embodiment.

Referring to FIG. 9, a second rotating plate 330 may include a second support portion 331, a first connecting portion 910, and a second connecting portion 920. The second support portion 331 may be coupled to a first support member 270. The second support portion 331 may include at least one fastening hole 930. The second support portion 331 may be coupled to the first support member 270 through at least one fastening hole 930. A fastening member for connecting the second support portion 331 and the first support member 270 may be inserted into the fastening hole 930. The second support portion 331 may support at least a part of the flexible display 230 by supporting the first support member 270. For example, a first area 231 of the flexible display 230 may be supported by the first support member 270, and the second support portion 331 may support the first support member 270 and the first area 231 of the flexible display 230.

The first connecting portion 910 may pivotably connect the first rotating plate 320 and the second rotating plate 330. The first connecting portion 910 may have a rail groove 911 forming a rotation path to have a first rotation axis 361. One of a plurality of rails 731 and 732 of the first rotating plate 320 may be inserted into the rail groove 911 of the first connecting portion 910. The rail groove 911 may be formed on both surfaces of the first connecting portion 910. For example, the rail groove 911 may be formed on a surface of the first connecting portion 910, and the rail groove (not shown) having the same shape as the rail groove 911 may be formed on another surface of the first connecting portion 910. The first rail 731 of the first rotating plate 320 may be inserted into the rail groove 911, and the second rail 732 of the first rotating plate 320 may be inserted into the same rail groove as the rail groove 911 formed on the other surface opposite the surface of the first connecting portion 910 on which the rail groove 911 is disposed. The first rail 731 and the second rail 732 of the first rotating plate 320 may be coupled to the first connecting portion 910, so that the second rotating plate 330 may pivot with respect to the first rotating plate 320.

According to an embodiment, the second connecting portion 920 may pivotably connect the second rotating plate 330 and the third rotating plate 340. The second connecting portion 920 may include a hinge hole 921 connected to a hole 821 for inserting a hinge pin of the third rotating plate. The hinge hole 921 and the hole 821 of the third rotating plate 340 may be connected to each other, and may accommodate a hinge pin for pivotably connecting the second rotating plate 330 and the third rotating plate 340.

Figure 10:
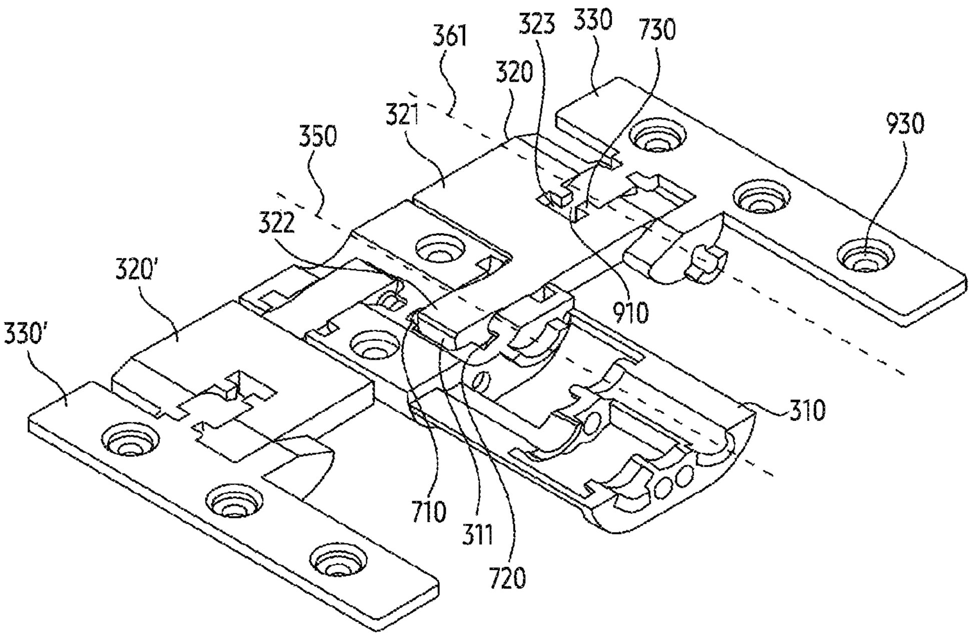
FIG. 10 is a perspective view of a first rotating plate and a second rotating plate of a hinge structure, according to an embodiment.
Figure 11:
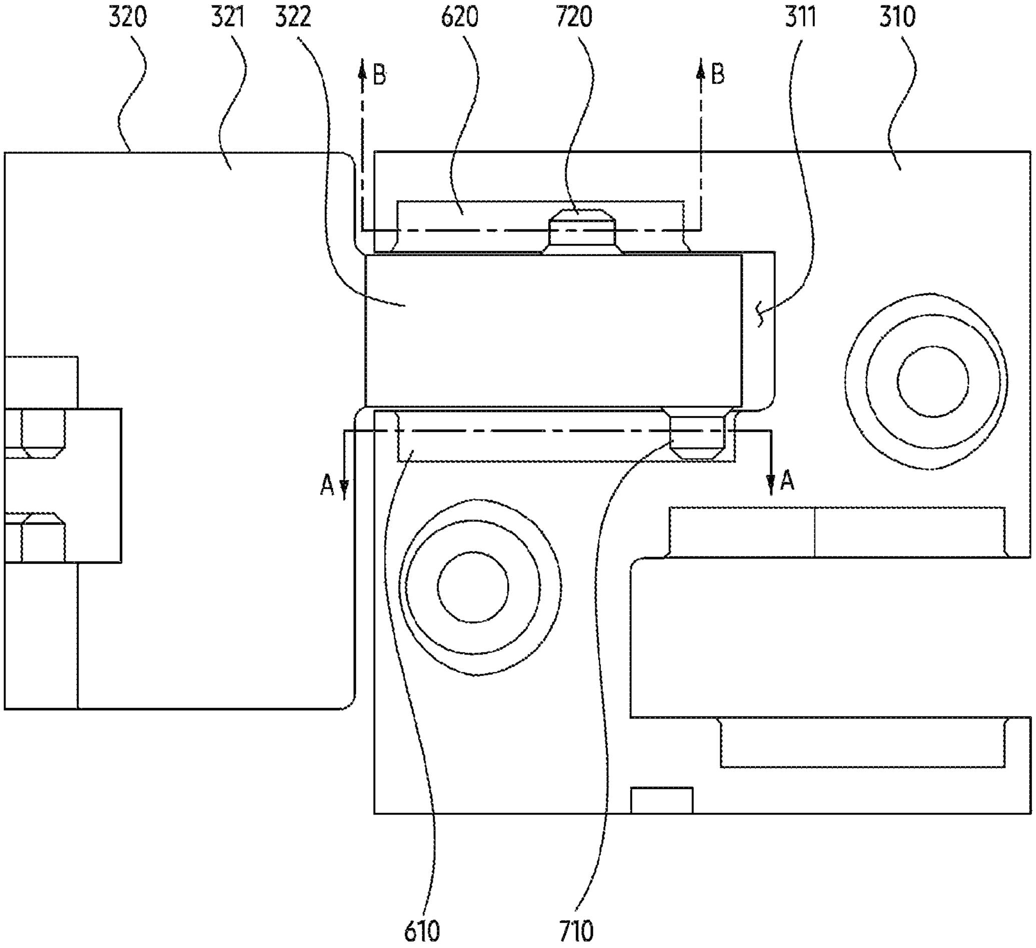
FIG. 11 is a plan view indicating a part of a connecting portion of a body and a first rotating plate of a hinge structure, according to an embodiment.
Figure 12A:
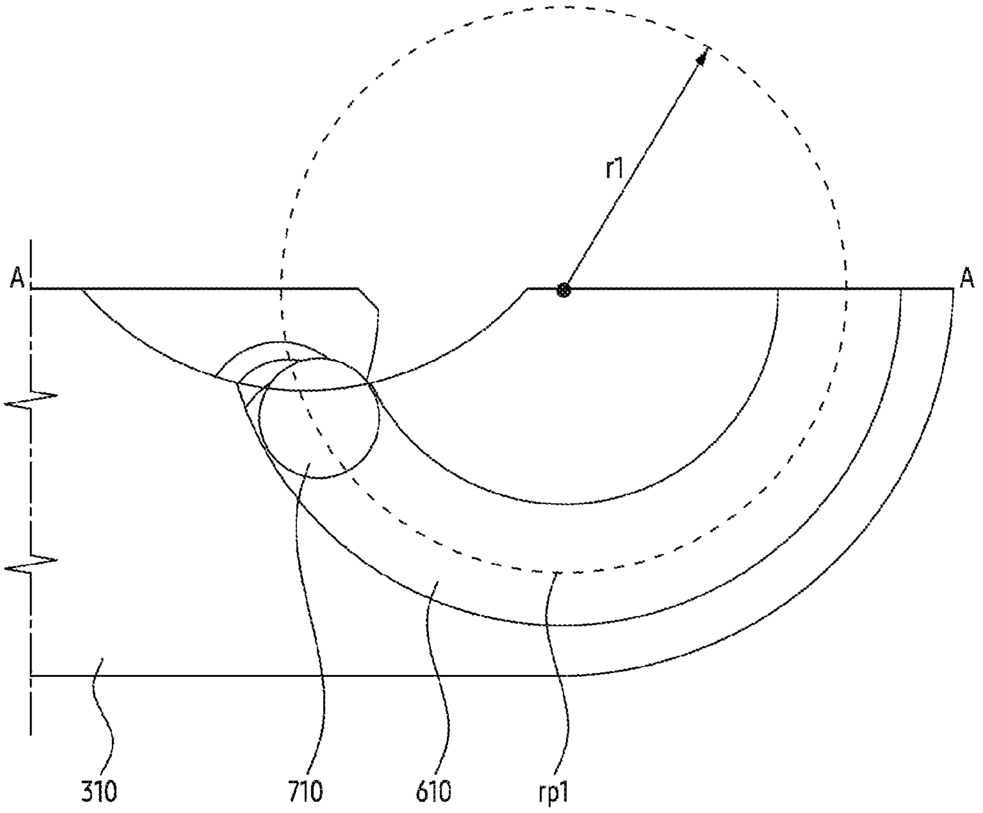
FIGS. 12A and 12B illustrate a coupling relationship between rotation pins of a first rotating plate and a groove formed in a body of a hinge structure, according to an embodiment.
Figure 12B:
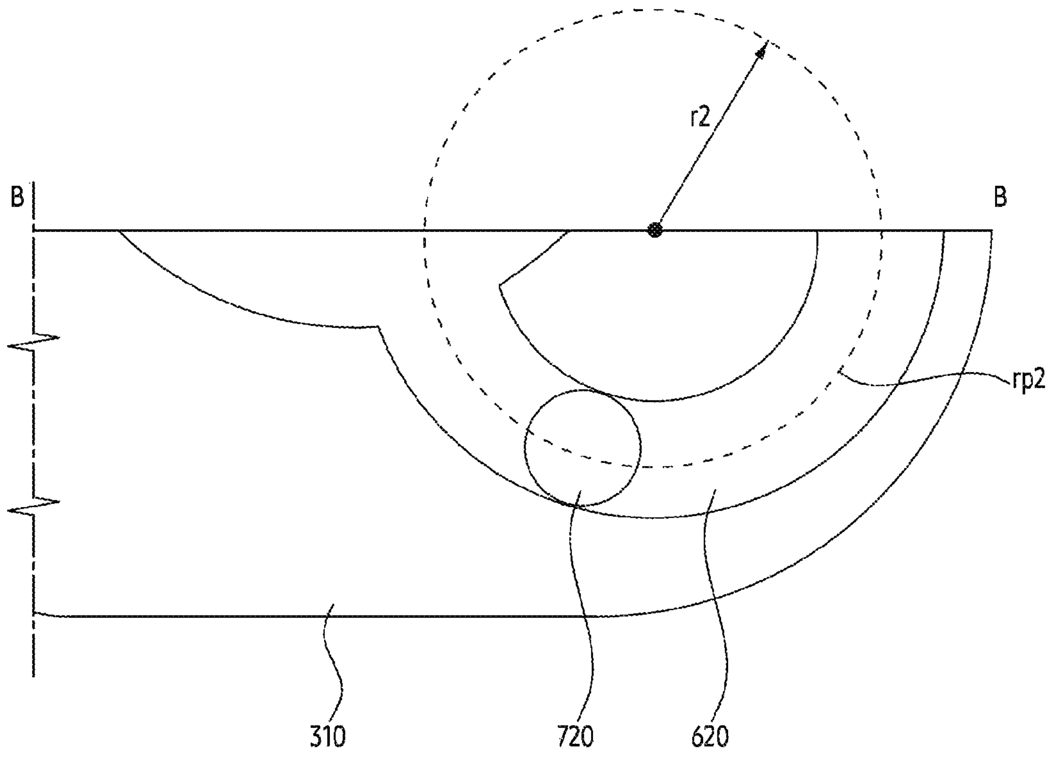
Figure 13:
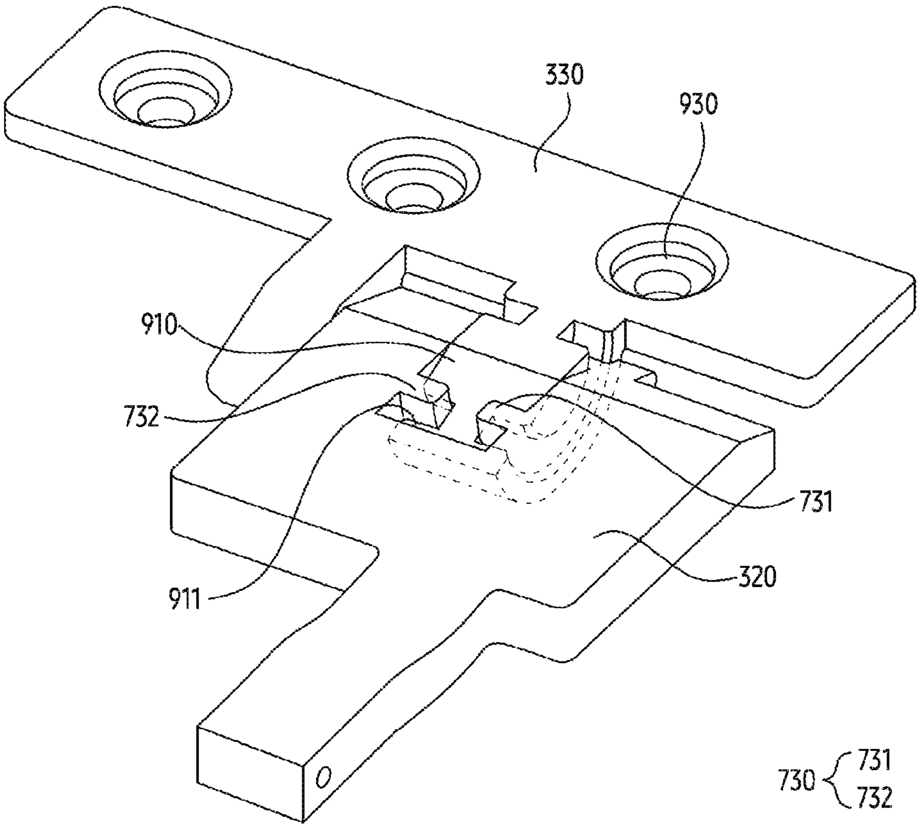
FIG. 13 illustrates a coupling relationship between a first rotating plate and a second rotating plate of a hinge structure, according to an embodiment.

FIG. 10 is a perspective view of a first rotating plate and a second rotating plate of a hinge structure, according to an embodiment, and FIG. 11 is a plan view indicating a part of a connecting portion of a body and a first rotating plate of a hinge structure, according to an embodiment, and FIGS. 12A and 12B illustrate a coupling relationship between rotation pins of a first rotating plate and a groove formed in a body of a hinge structure, according to an embodiment, and FIG. 13 illustrates a coupling relationship between a first rotating plate and a second rotating plate of a hinge structure, according to an embodiment.

Referring to FIGS. 10 and 13, a hinge structure 300 may include a body 310 facing a third area 233 of a flexible display 230 and including a first guide groove forming a first rotation path and a second guide groove forming a second rotation path having a second rotation axis different from a first rotation axis of the first rotation path, in order to pivotably connect to a side of the body 310, a first rotating plate 320 including a first pin 710 in the first guide groove moved along the first rotation path having the first rotation axis and a second pin 720 in the second guide groove moved along the second rotation path having the second rotation axis while the first pin 710 is moved, and a second rotating plate 330 pivotably connected to the first rotating plate 320.

The body 310 may be coupled to the first rotating plate 320 by two rotation axes, in order to form a variable rotation axis 350. The body 310 may include grooves in which a plurality of rotation paths for a rotation of the first rotating plate 320 are formed. For example, the plurality of rotation paths may be configured with different rotation axes. The first rotating plate 320 may include a plurality of pins capable of moving along the plurality of rotation paths. A specific embodiment for the plurality of pins or the plurality of rotation paths described above will be described with reference to FIGS. 11, 12A, and 12B to be described later.

The body 310 may include a first fastening portion 311 into which a connecting portion 322 of the first rotating plate 320 is inserted by the variable rotation axis 350. The first fastening portion 311 may include guide grooves into which the first pin 710 and the second pin 720 are inserted. The body 310 may have a configuration of a corresponding fastening portion for a connection with another first rotating plate 320' corresponding to the first rotating plate 320.

The first rotating plate 320 may have a configuration pivotably coupled to the body 310 and a configuration pivotably coupled to the second rotating plate 330. For example, the first rotating plate 320 may include the first pin 710 and the second pin 720, in order to be pivotably coupled to the body 310. The first rotating plate 320 may include a fastening portion 323, in order to be pivotably coupled to the second rotating plate 330. The fastening portion 323 may include a rail portion 730 inserted into a rotation groove formed in the third rotating plate 330.

According to an embodiment, the first rotating plate 320 may rotate based on the body 310 along the variable rotation axis 350 by the first pin 710 and the second pin 720. The first rotating plate 320 may rotate based on the second rotating plate 330 along a first rotation axis 361 by the rail portion 730. As the rail portion 730 including the first rail 731 and the second rail 732 may be inserted into a rail groove 911 of the second rotating plate 330 so that the first rotating plate 320 may be rotatably coupled to the second rotating plate 330. Another first rotating plate 320' corresponding to the first rotating plate 320 and another second rotating plate 330' corresponding to the second rotating plate 330 may be equally or similarly applied to the first rotating plate 320 and the second rotating plate 330 described above. According to the above-described embodiment, since the first rotating plate 320 and the body 310 are rotated by the variable rotation axis 350, and the first rotating plate 320 is moved away from a folding axis 237 in a transient state 302 or a folded state 303, damage to the flexible display 230 may be reduced by reducing the amount of compression of the flexible display 230.

Referring to FIGS. 11, 12A, and 12B, the body 310 may include a first guide groove 610 of the first fastening portion 311 and a second guide groove 620 of the first fastening portion 311. The first guide groove 610 may accommodate the first pin 710, and the second guide groove 620 may accommodate the second pin 720. The first guide groove 610 may guide the first pin 710 to rotate along a rotation axis of a first rotation path rp1. The second guide groove 620 may guide the second pin 720 to rotate along a rotation axis of a second rotation path rp2.

A radius r1 of the first rotation path rp1 may be different from a radius r2 of the second rotation path rp2. The radius r1 of the first rotation path rp1 may be greater than the radius r2 of the second rotation path rp2. A position of the first pin 710 may be determined by a position of the second pin 720 by setting the first rotation path rp1 and the second rotation path rp2 differently. For example, when the first pin 710 is located at a point on the first rotation path rp1, the second pin 720 may be located at a point spaced apart from the point by a distance between the first pin 710 and the second pin 720 on the second rotation path rp2. According to an embodiment, a movement range of the first pin 710 and the second pin 720 may be limited. For example, it may move along the first rotation path rp1 and the second rotation path rp2 only within an area spaced apart by the distance between the first pin 710 and the second pin 720.

According to an embodiment, the first rotating plate 320 may rotate based on the body 310 and may have the variable rotation axis 350. The variable rotation axis 350 may be moved by the first rotation path rp1 of the first pin 710 and the second rotation path rp2 of the second pin 720. For example, since the first pin 710 moving along the first rotation path rp1 and the second pin 720 moving along the second rotation path rp2 are spaced apart by a designated distance, the first rotating plate 320 may move in a direction away from the folding axis while rotating based on the variable rotation axis 350. The variable rotation axis 350 may be moved by the first pin 710 and the second pin 720. When the electronic device is switched from the folded state to the unfolded state, the variable rotation axis 350 may be configured close to a neutral surface of the flexible display 230, according to positions of the first pin 71 and the second pin 720.

According to the above-described embodiment, since the first rotating plate 320 has the variable rotation axis 350, the electronic device 101 may arrange the variable rotation axis 350 close to a neutral surface 530 of the flexible display 230. The variable rotation axis 350 disposed close to the neutral surface 530 of the display 230 may prevent the flexible display 230 from buckling by reducing a compressive force applied to the flexible display 230.

Figure 14:
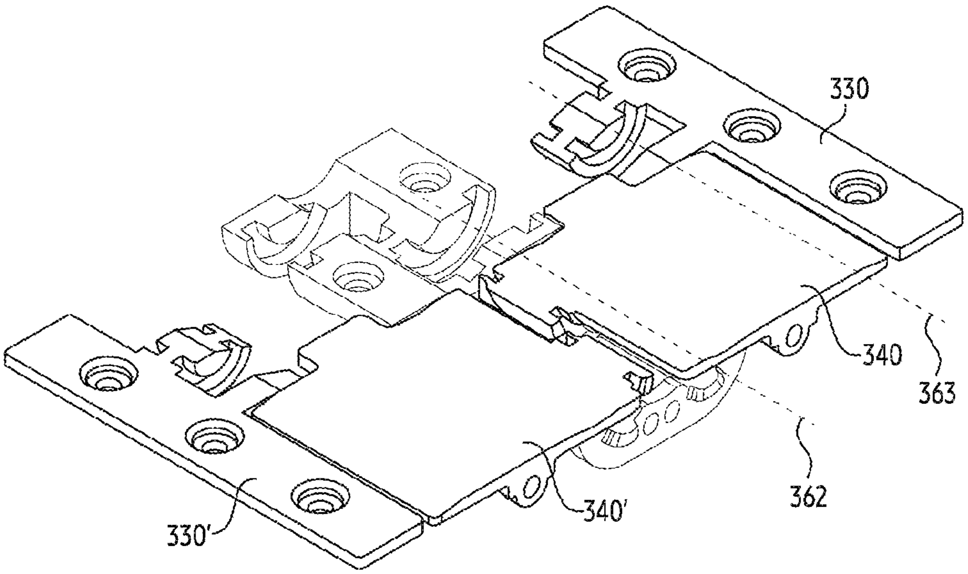
FIG. 14 illustrates a coupling relationship between a second rotating plate and a third rotating plate of a hinge structure, according to an embodiment.
Figure 15:
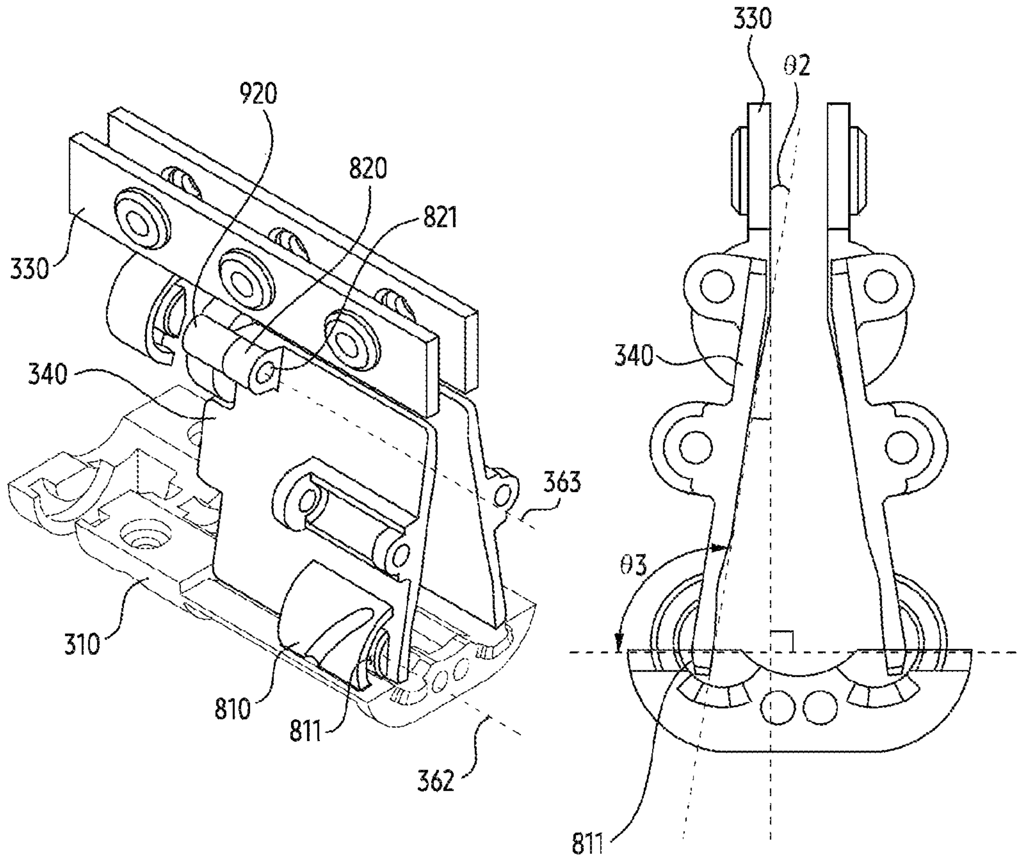
FIG. 15 illustrates a coupling relationship between a second rotating plate and a third rotating plate in a folded state, according to an embodiment.

FIG. 14 illustrates a coupling relationship between a second rotating plate and a third rotating plate of a hinge structure, according to an embodiment, and FIG. 15 illustrates a coupling relationship between a second rotating plate and a third rotating plate in a folded state, according to an embodiment.

Referring to FIGS. 14 and 15, in an unfolded state 301, a second rotating plate 330 and a third rotating plate 340 may form a plane. The third rotating plate 340 may be pivotably connected to the body 310 based on a second rotation axis 362. The third rotating plate 340 may be pivotably connected to the second rotating plate 330 based on a third rotation axis 363 at a periphery opposite to a periphery pivotably connected to a body 310.

The second rotating plate 330 may rotate by a rotation of the third rotating plate 340. As described in FIG. 3B, the third rotating plate 340, the body 310, a first rotating plate (e.g., the first rotating plate 320 of FIG. 3B), and the second rotating plate 330 may be coupled to each other. For example, the third rotating plate 340 may be pivotably connected to the body 310 based on the second rotation axis 362, and may be pivotably connected to the second rotating plate 330 based on the third rotation axis 363. The first rotating plate 320 may be movably connected to the body 310 based on a variable axis (e.g., the variable axis 350 of FIG. 3B), and may be pivotably connected to the second rotating plate 330 based on the first rotation axis 361. Since the third rotating plate 340 is pivotably connected to the second rotating plate 330 and the body 310 in an axis different from an axis of the first rotating plate 320, movement of the third rotating plate 340 may be related to movement of the first rotating plate 320.

According to an embodiment, a rotation angle of the third rotating plate 340 may be determined by the first rotating plate 320. When the electronic device 101 is switched from the unfolded state 301 to the folded state 303, like the first rotating plate 320, the third rotating plate 340 may move by an angle Θ3 of 90 degrees or more from a surface of the body 310 facing the flexible display (e.g., the flexible display 230 of FIG. 2C). An angle between a virtual line extending from the second rotating plate 330 and the third rotating plate 340 may be an angle Θ2. By the angle Θ2, the second rotating plate 330 may rotate less than the third rotating plate 340. In the folded state 303, the second rotating plate 330 may rotate less than the third rotating plate 340 in order to be perpendicular to a surface 313 of the body 310.

According to an embodiment, the third rotating plate 340 may move by an angle Θ3 of 90 degrees or more from a surface of the body 310, and the second rotating plate 330 may form 90 degrees based on the surface of the body 310. According to an embodiment, a third display area (e.g., the third display area 233 of FIG. 2C) may be bent by a rotation the third rotating plate 340 and another third rotating plate 340' corresponding to the third rotating plate 340. According to an embodiment, since the second rotating plate 330 and the other second rotating plate 330' corresponding to the second rotating plate 330 form 90 degrees based on a surface of the body 310, a first display area (e.g., the first display area 231 of FIG. 2C) and a second display area (e.g., the second display area 232 of FIG. 2C) may be parallel to each other. As shown in FIG. 3C, the third display area 233 of the flexible display 230 may be bent in a shape including a curve (e.g., a water drop shape), and the first display area 231 and the second display area 232 may be parallel.

According to the above-described embodiment, the third rotating plate 340 may be pivotably connected to the second rotating plate 330 and may be pivotably connected to the body 310. A rotation angle of the third rotating plate 340 and the second rotating plate 330 may be determined by the first rotating plate 320, and a rotation angle Θ3 of the third rotating plate 340 and a rotation angle Θ2 of the second rotating plate 330 may be different. The flexible display 230 supported by the hinge structure may have a curved area in a shape (e.g., a water drop shape) including a curve, due to a difference between the rotation angle Θ3 of the third rotating plate 340 and the rotation angle Θ2 of the second rotating plate 330.

Figure 16A:
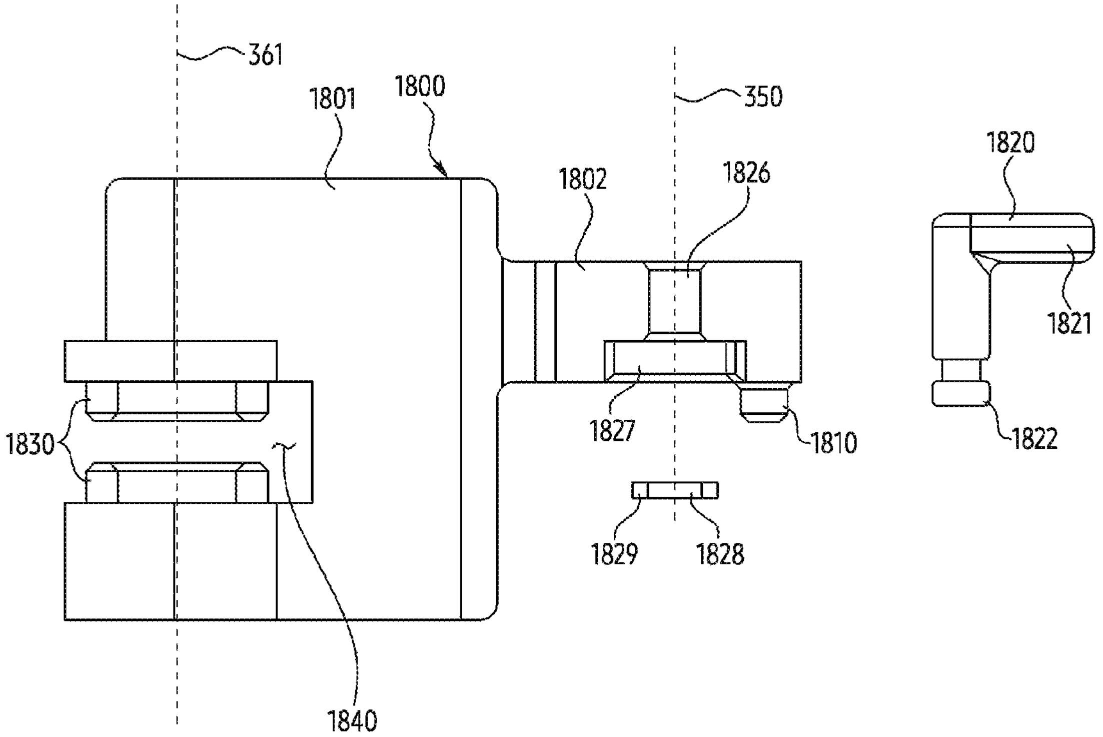
FIGS. 16A and 16B illustrate an example in which a first rotating plate has a deformed rotation pin, according to an embodiment.
Figure 16B:
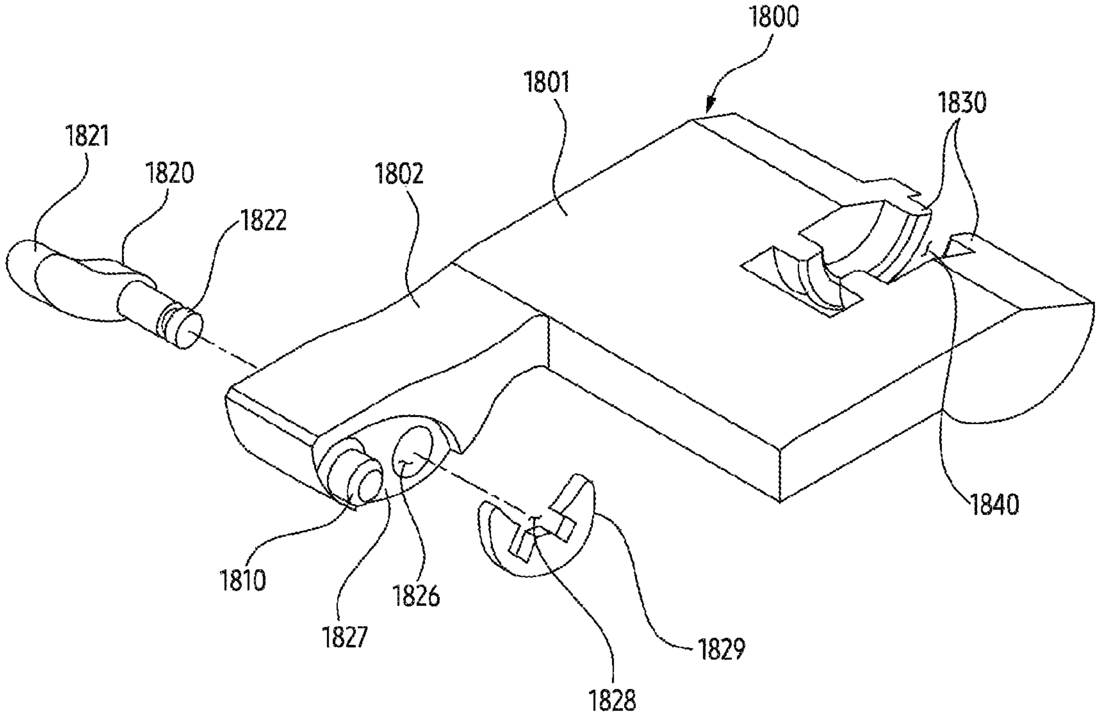
Figure 17:
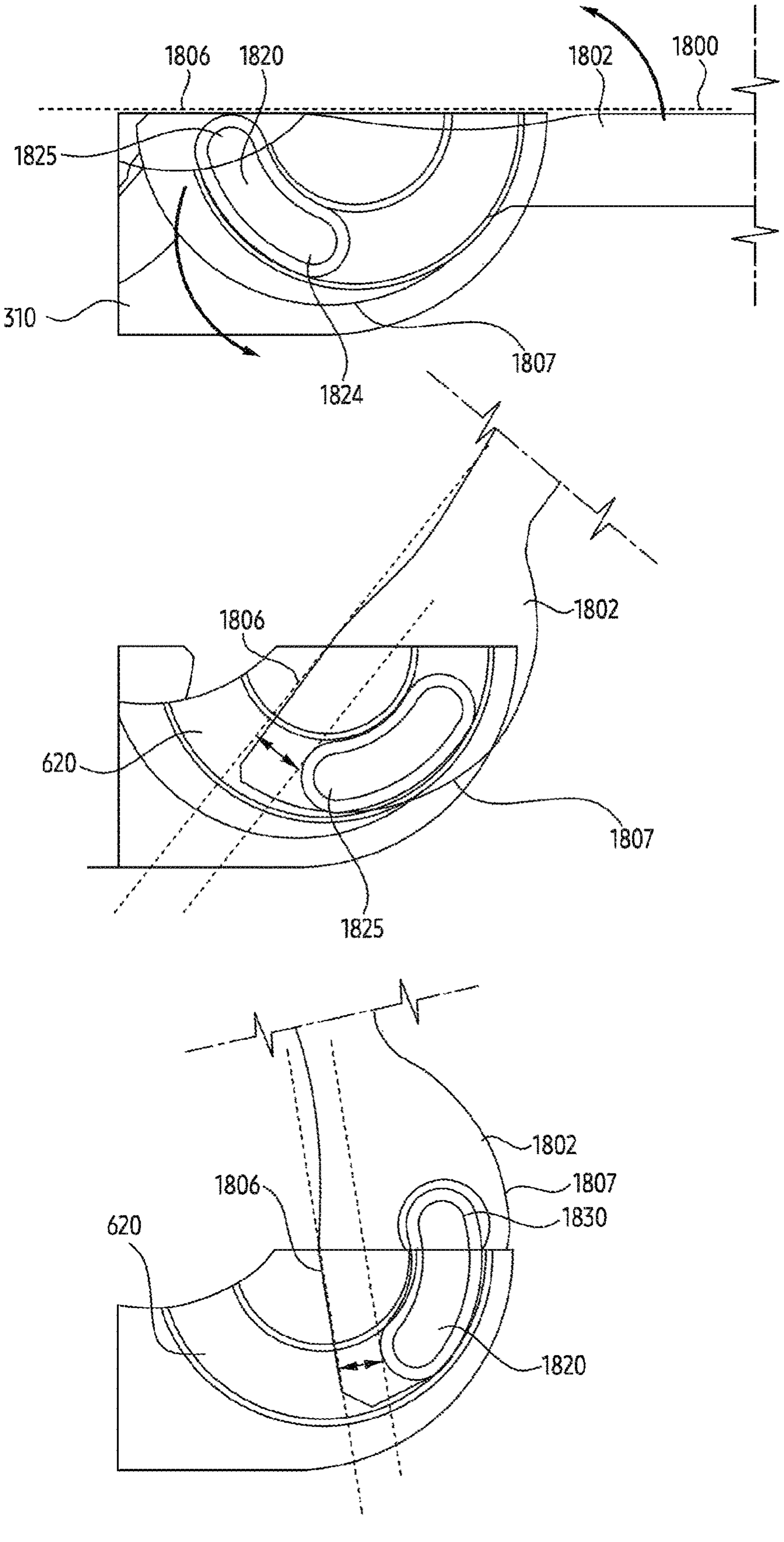
FIG. 17 illustrates a positional relationship of a deformed rotation pin while a first rotating plate rotates, according to an embodiment.

FIGS. 16A and 16B illustrate an example in which a first rotating plate has a deformed rotation pin, according to an embodiment, and FIG. 17 illustrates a positional relationship of a deformed rotation pin while a first rotating plate rotates, according to an embodiment.

Referring to FIGS. 16A and 16B, a first rotating plate 1800 (e.g., the first rotating plate 320 of FIG. 3A) may include a first support portion 1801, a connecting portion 1802 extending from the first support portion 1801 and a fastening portion 1840. The first support portion 1801 may support a flexible display 230. In an unfolded state 301, the first support portion 1801 may form the same plane as a surface formed by support portions of other rotating plates. The connecting portion 1802 of the first rotating plate 1800 may extend from a side surface of the first support portion 1801. As the connecting portion 1802 of the first rotating plate 1800 is coupled with a first fastening portion 311 of a body 310, the first rotating plate 1800 may pivot based on the body 310.

According to an embodiment, the first rotating plate 1800 may include a first pin 1810 protruding from a side surface of the first connecting portion 1802 and a first pin 1820 inserted into a hole 1826 for a rotation of the first connecting portion 1802. The first pin 1810 may protrude from the side surface of the first connecting portion 1802. The second pin 1820 may include a axis inserted into the hole 1826, a fixing protrusion 1822 formed at an end of the axis, and an extended pin 1821 formed at another end of the axis. The extended pin 1821 may be formed in a shape corresponding to a part of a second guide groove 620 of the body 310.

The first pin 1810 may be inserted into a first guide groove 610 of the body 310, and the second pin 1820 may be inserted into the second guide groove 620 of the body 310. For example, the second pin 1820 may be inserted into the second guide groove 620 of the body 310 and may move along the second guide groove 620.

The second pin 1820 may be inserted into the hole 1826 and rotatably coupled. For example, the second pin 1820 may be inserted into the hole 1826 and fastened to the connecting portion 1802 by a fixing member 1829 fitted to the fixing protrusion 1822. The fixing member 1829 may have a groove 1828 or a hole in order to be inserted into the fixing protrusion 1822. The fixing member 1829 may be disposed in a seating groove 1827 disposed at an end portion of the hole 1826.

The first support portion 1801 may include a fastening portion 1840 capable of being connected to a second rotating plate (e.g., the second rotating plate 330 of FIG. 3A). The fastening portion 1840 may include a rail portion 1830 for fastening to the body 310.

The first pin 1810 may rotate along a first rotation path provided by the first guide groove 610 of the body 310, and the second pin 1820 may rotate along a second rotation path provided by the second guide groove 620. A rotation axis of the first rotation path in which the first pin 1810 moves may be different from a rotation axis of the second rotation path in which the second pin 1820 moves. A position of the first pin 1810 may be determined according to movement of the second pin 1820.

Referring to FIG. 17, in the unfolded state 301, the second pin 1820 may be inserted into the second guide groove 620 and disposed adjacent to a surface 1806 of the connecting portion 1802. For example, the second guide groove 620 may be occupied by the rotation pin 1820 and may be formed in the body 310 to guide movement of the second pin 1820. The second guide groove 620 may be formed in a shape corresponding to a shape of the extended pin 1821 formed at an end portion of the second pin 1820. For example, the extended pin 1821 may have a partial shape of a circle such as an arc, and the second guide groove 620 may be an extended shape of an arc in which the extended pin 1821 is formed. The rotation pin 1820 may include a first end 1824 on which a rotation axis is disposed and a second end 1825 distinguished from the first end 1824. In the unfolded state 301, the second end 1825 of the second pin 1820 may be disposed to contact with the first surface 1806 of the connecting portion 1802.

In a transient state 302 in which the second pin 1820 starts to rotate downward, the second pin 1820 may be spaced apart from the first surface 1806 of the connecting portion 1802. The second pin 1820 may rotate by a rotation axis located at the first end 1824. The second pin 1820 may rotate based on the first rotating plate 1800 with respect to the rotation axis located at the first end 1824. The second pin 1820 may be in contact with or close to a second surface 1807 formed as a curved surface and faces the first surface 1806 of the connecting portion 1802 of the first rotating plate 1800. For example, the first pin 1810 may move along the first guide groove opposite to the second guide groove 620 at the same time when the first rotating plate 1800 moves along the second guide groove 620 of the body 310. Since the first pin 1810 and the second pin 1820 rotate at a spaced distance, the first rotating plate 1800 may move in a designated movement path based on the body. Since the first rotating plate 1800 does not rotate based on an axis, it may have a variable rotation axis 350. The first rotating plate 1800 may be connected to the body 310 to move while rotating. For example, the first rotating plate 1800 may rotate based on the variable rotation axis 350, and the variable rotation axis 350 may move to move away from a folding axis (e.g., the folding axis 237 of FIG. 3A). According to movement of the first rotating plate 1800, the second pin 1820 may rotate, may be in contact with the second surface 1807 of the connecting portion 1802 of the first rotating plate 1800 in the transient state 302, and may be spaced apart from the first surface 1806 of the connecting portion 1802.

According to an embodiment, in the transient state 302, since the first rotating plate 1800 rotates while having a distance between the rotation axes of the first pin 1810 and the second pin 1820, it may move to move away from the body 310. Movement path of the rotation axis of the second pin 1820 of the rotating plate 1800 may be determined according to movement of the pin 1810. The second pin 1820 may move the first rotating plate 1800 while rotating it based on the body 310.

In the folded state 303, the second pin 1820 may be spaced apart from the first surface 1806 of the connecting portion 1802. A part 1830 of the second pin 1820 may be exposed to the outside from the second guide groove 620. For example, the end 1824 on which the rotation axis of the rotation pin 1820 is located may be exposed to the outside. According to an embodiment, in the folded state 303 or the transient state 302, the first rotating plate 1800 may include the first pin 1810 and the second pin 1820 with different rotation paths, in order for the rotation axis of the first rotating plate 1800 to move toward a periphery of the flexible display 230. In the folded state 303, the second pin 1820 rotating along a second rotation path rp2 may be exposed to the outside of the body than the first pin 1810 moving along a first rotation path rp1. For example, the second pin 1820 moving along the second rotation path rp2, which has a small radius of rotation, may be exposed to the outside in the folded state.

The second pin 1820 that does not include the extended pin 1821 may be exposed to the outside in the folded state 303, and the first rotating plate 1800 may be disassembled from the body 310 due to exposure of the second pin 1820 that does not include the extended pin 1821. When the second pin 1820 includes the extended pin 1821, the second end 1825 may be disposed within the second guide groove 620 in the folded state 303. The second pin 1820 may prevent disassembly from the body 310 by arranging a part including the second end 1825 of the rotation pin within the guide groove 620 even in the folded state.

Figure 18A:
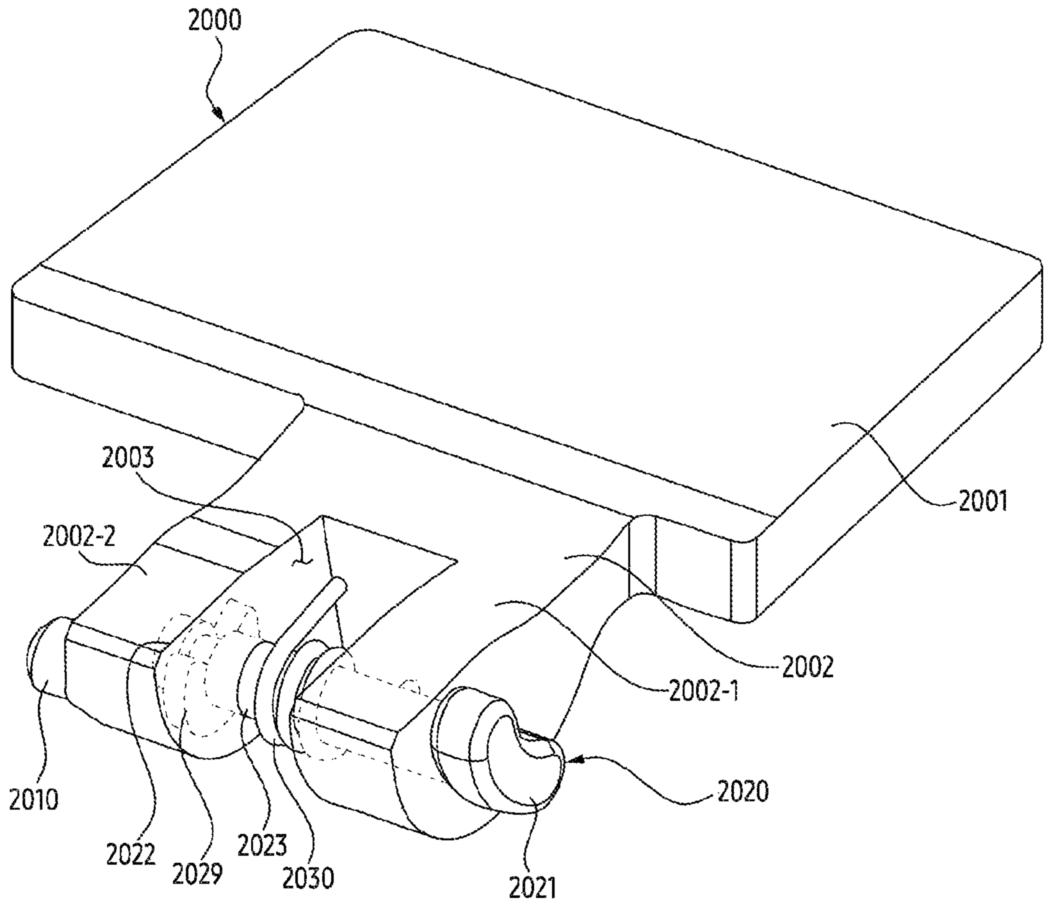
FIGS. 18A and 18B are an example of a first rotating plate having a spring applying an elastic force to a rotation pin of a first rotating plate, according to an embodiment.
Figure 18B:
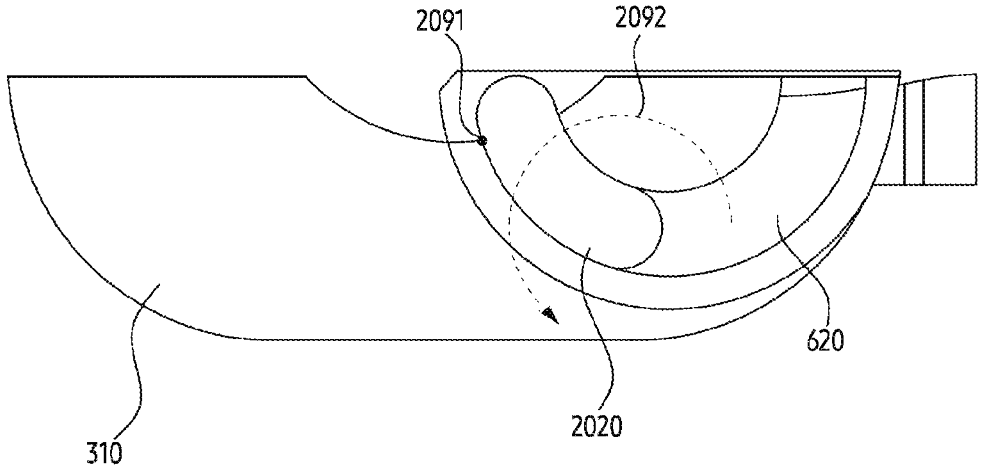

FIGS. 18A and 18B are an example of a first rotating plate having a spring applying an elastic force to a rotation pin of a first rotating plate, according to an embodiment.

Referring to FIG. 18A, a first rotating plate 2000 may include a first support portion 2001 and a connecting portion 2002. The connecting portion 2002 may be configured with a first support portion 2002-1 and a second support portion 2002-2. The connecting portion 2002 may include a first pin 2010 and a second pin 2020 including an extended pin 2021.

The second pin 2020 may include a shaft 2023 capable of penetrating a hole formed in the connecting portion 2002, and include a fixing protrusion 2022 at an end portion of the shaft 2023. The fixing protrusion 2022 may be coupled to a fixing member 2029 and seated on the connecting portion 2002. The second pin 2020 may rotate with respect to the first rotating plate 2000 based on an axis of the shaft 2023.

An elastic member 2030 may be disposed on the shaft 2023 disposed in a space 2003 between the first connecting portion 2002-1 and the second connecting portion 2002-2. The elastic member 2030 may be a torsion spring and may surround the shaft 2023.

According to an embodiment, when the shaft 2023 rotates, the elastic member 2030, which is a torsion spring, may transmit torque in a direction opposite to a rotation direction of the shaft 2023.

Referring to FIG. 18B, the second pin 2020 located in the second guide groove 620 of the body 310 may press the second guide groove 620 by torque 2092 applied in a counterclockwise direction by the elastic member 2030. The second pin 2020 may increase frictional force with the second guide groove 620 by applying pressure to the second guide groove 620 through the elastic member 2030.

According to the above-described embodiment, the second pin 2020 may increase the frictional force with the second guide groove 620, and fix a rotation position when external force is not applied after the first rotating plate 2000 rotates at a certain angle. The electronic device 101 may implement a pre-stop function in which the flexible display 230 may be fixed within a designated range by fixing the rotation position.

Figure 19:
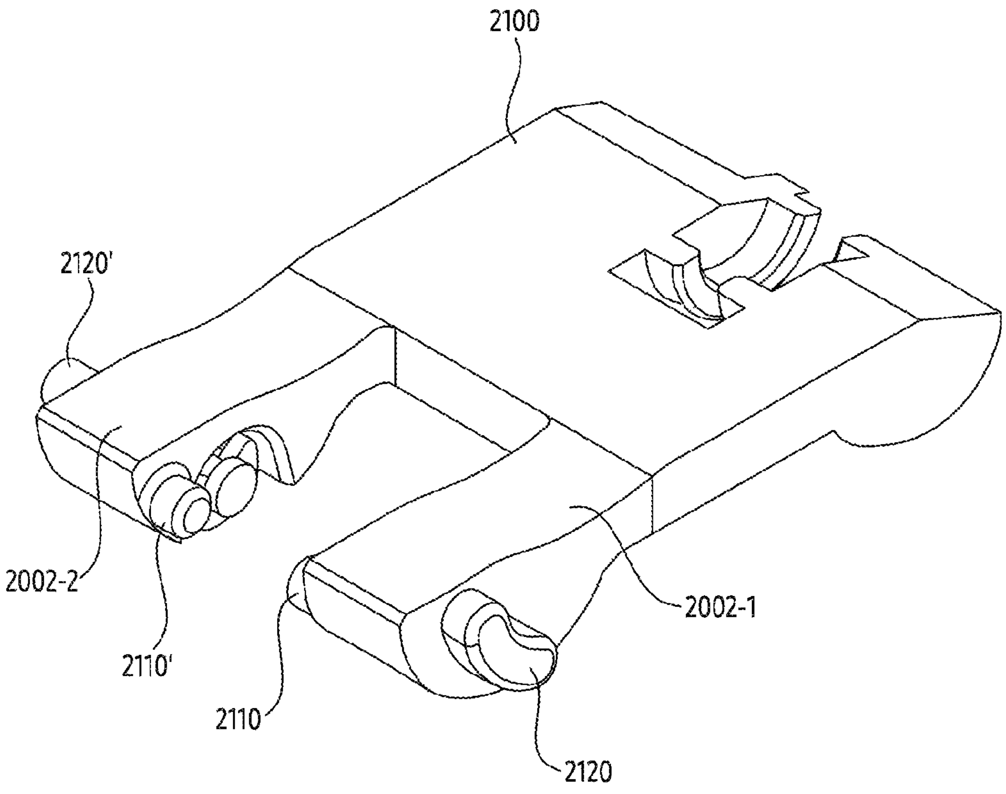
FIG. 19 illustrates an example in which a plurality of rotation pins are provided on a first rotating plate, according to an embodiment.

FIG. 19 illustrates an example in which a plurality of rotation pins are provided on a first rotating plate, according to an embodiment.

Referring to FIG. 19, a first rotating plate 2100 may have rotation pins, which are symmetric. For example, the first rotating plate 2100 may furnish with a first pin 2110 and a second pin 2120, and may further include a pin 2110' corresponding to the first pin 2110 and a rotation pin 2120' corresponding to the second pin 2120.

As the first rotating plate 2100 furnish with rotation pins, which are symmetric, movement of the rotation axis may be generated by a gap between a guide groove (e.g., the second guide groove 620 of FIG. 6A) formed in a body (e.g., the body 310 of FIG. 3A) and the second pin 2120 for movement of the rotation pin 2120 having an extended pin. Since asymmetry may be generated in switching between the folded or unfolded state of an electronic device when flow of a rotation axis occurs due to a gap between the second pin 2120 and the guide groove, a method to prevent it is required.

When other gaps are asymmetrically disposed on the first rotating plate 2100 in arrangement of the second pin 2120, the first rotating plate 2100 may be inclined toward a larger gap, which may cause incline of the flexible display 230. The first fin 2110 and the second fin 2120 may prevent a gap from being biased to one side, by symmetrically arranging the third pin 2110' corresponding to the first pin 2110 and the fourth pin 2120' corresponding to the second pin 2120. For example, the first rotating plate 2100 may include a first support portion 2002-1 and a second support portion 2002-2. The first support portion 2002-1 and the second support portion 2002-2 may be configured to be symmetrical to each other, and the first support portion 2002-1 may furnish with the first pin 2110 and the second rotation pin 2120. The second support portion 2002-1 may furnish with the third pin 2110' corresponding to the first pin 2110 and the fourth pin 2120' corresponding to the second pin 2120. The first rotating plate 2100 that furnishes with rotation pins symmetrical to each other may prevent the rotating plate 2100 from being biased to one side, and may reduce a degree to which the flexible display 230 is inclined in a direction.

Figure 20:
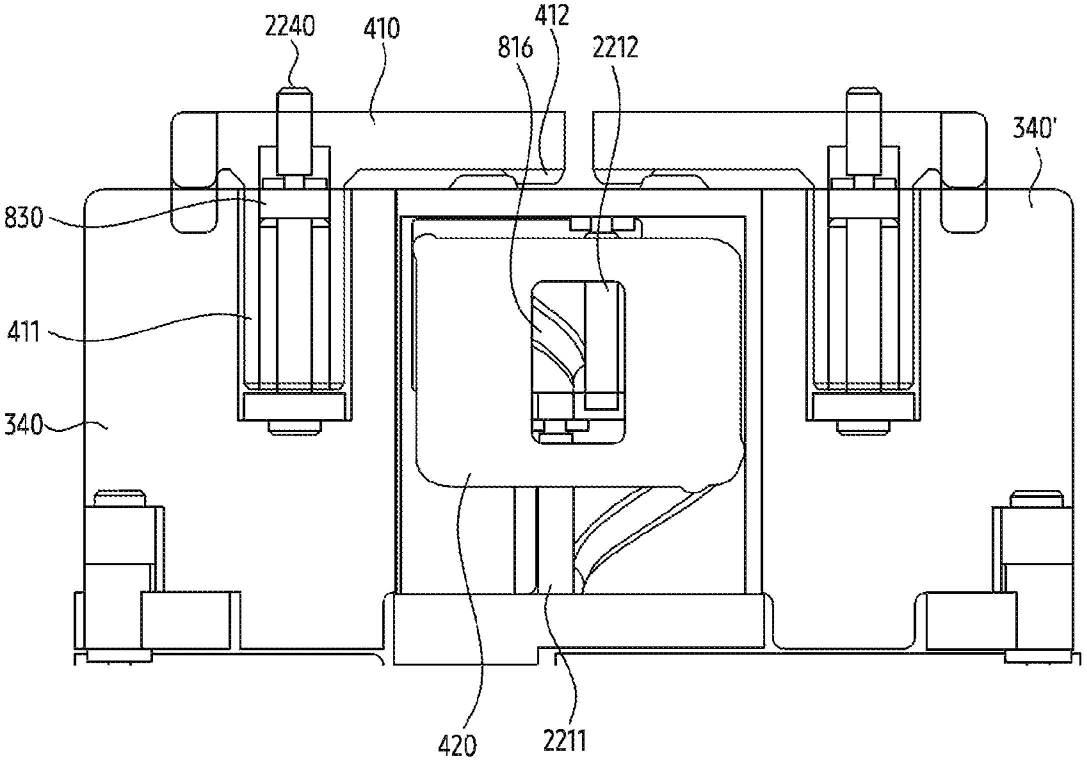
FIG. 20 illustrates a spiral interlocking structure of an electronic device, according to an embodiment.
Figure 21A:
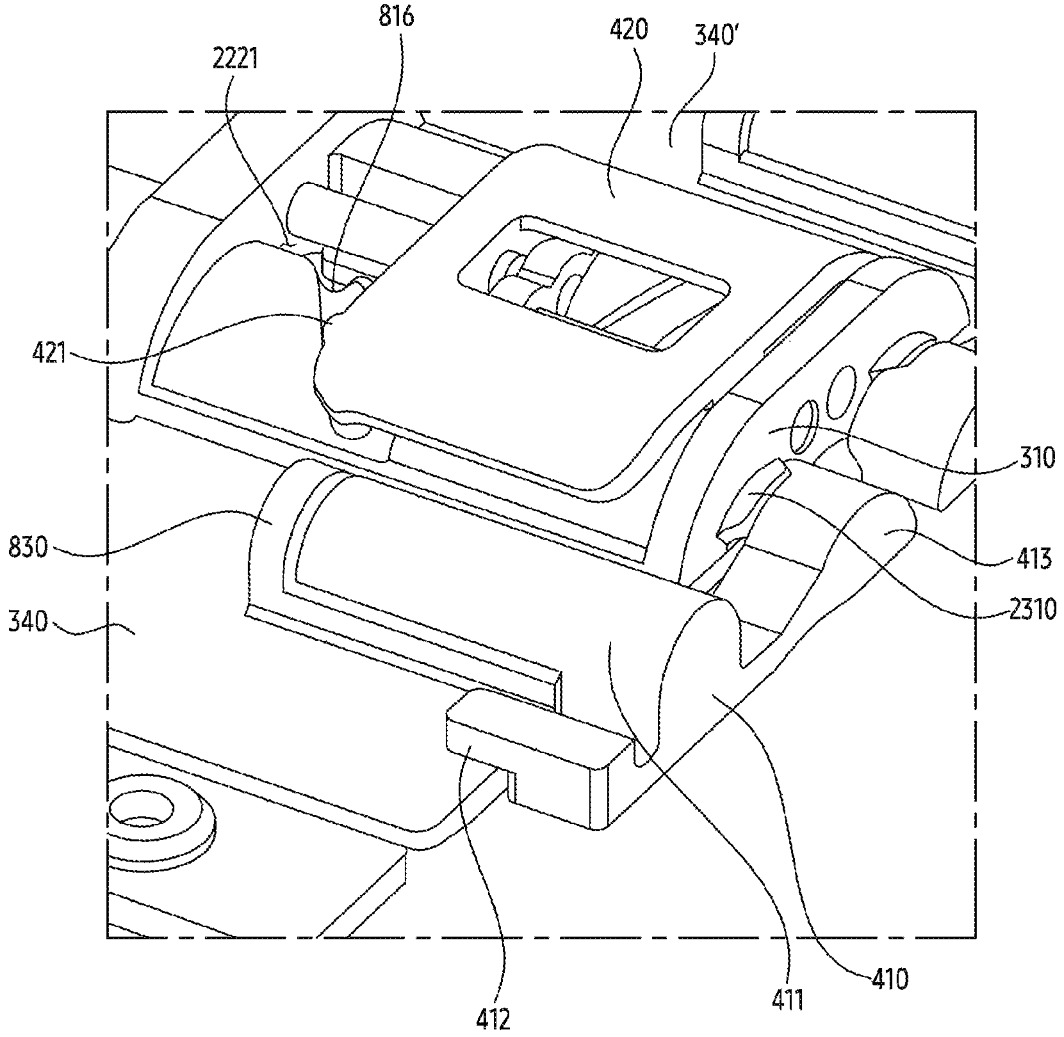
FIGS. 21A and 21B illustrate an operation of a spiral interlocking structure of an electronic device, according to an embodiment.
Figure 21B:
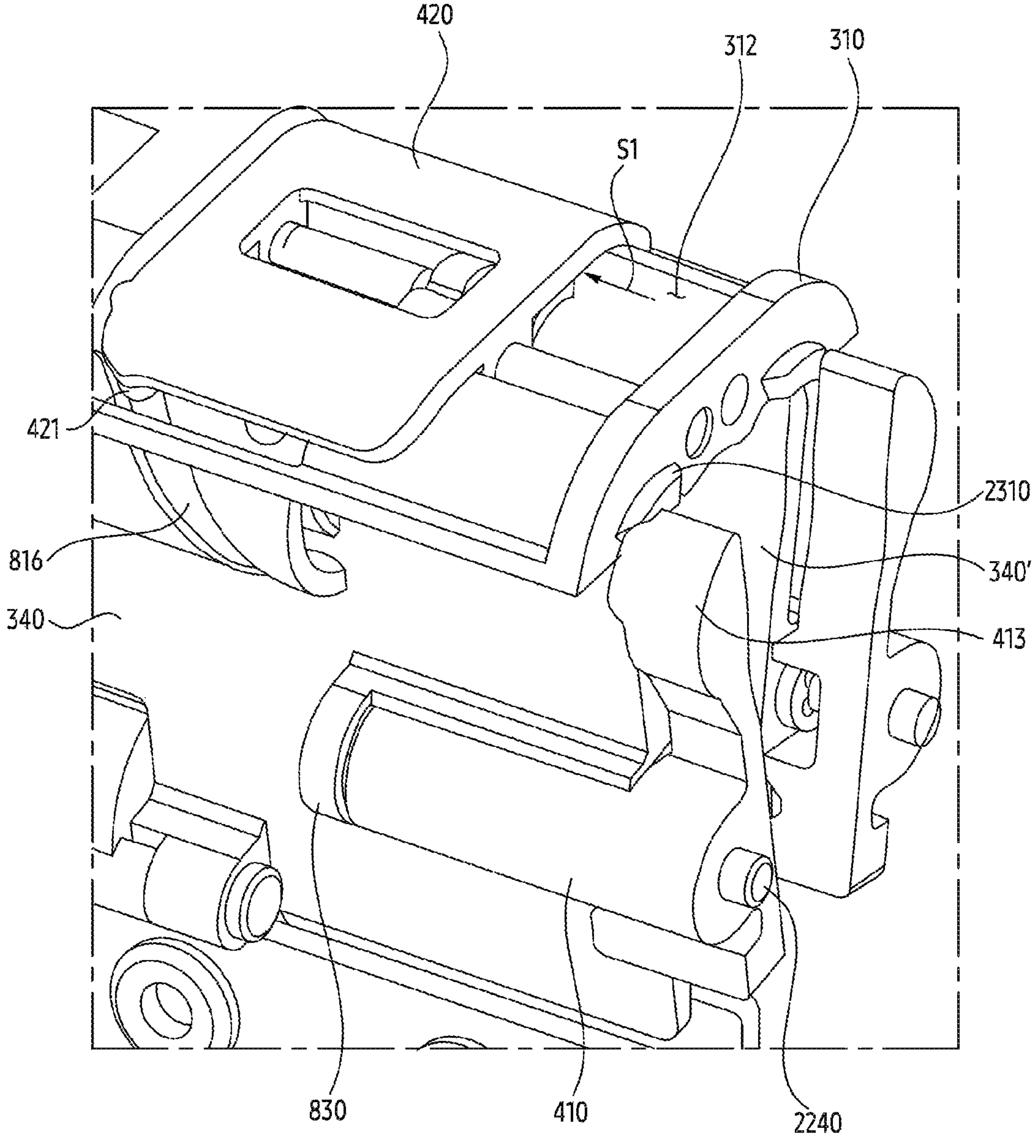

FIG. 20 illustrates a spiral interlocking structure of an electronic device, according to an embodiment, and FIGS. 21A and 21B illustrate an operation of a spiral interlocking structure of an electronic device, according to an embodiment.

Referring to FIGS. 20, 21A, and 21B, a hinge structure may include a slider 420 that interlocks a third rotating plate 340 with another third rotating plate 340' corresponding to the third rotating plate 340. The slider 420 may be connected by axes 2211 and 2212 to slide an opening 2221 formed in a body 310. The slider 420 may include a sliding protrusion 421 capable of moving along a spiral groove 816 formed in the third rotating plate 340.

The spiral groove 816 may be formed in the third rotating plate 340, and the other third rotating plate 340' corresponding to the third rotating plate 340 may also furnish with a spiral groove.

In the unfolded state as shown in FIG. 21A, the slider 420 may be in contact with a periphery of the opening 2221 of the body 310. For example, the slider 420 may occupy a part of the opening 2221 of the body 310 and may contact a periphery from among peripheries perpendicular to a moving direction of the slider 420. In the folded state as shown in FIG. 21B, the slider 420 may be in contact with another periphery of the opening 2221 of the body 310. For example, the slider 420 may be in contact with another periphery from among peripheries perpendicular to the moving direction of the slider 420, from among the peripheries of the opening 2221 of the body 310. The spiral groove 816 of the third rotating plate 340 may be formed of a spiral, and a spiral groove formed in the other third rotating plate 340' corresponding to the third rotating plate 340 may be line-symmetric with the spiral groove 816 of the third rotating plate 340. The slider 420 may include a sliding protrusion inserted into each of spiral grooves. The protrusions inserted into each of spiral grooves may move along the spiral groove when the third rotating plate 340 and the other third rotating plate 340' rotate. By movement of the protrusions inserted into the spiral groove, the slider 420 may move along a designated direction s1.

The sliding protrusion 421 may move along the spiral groove 816 of the third rotating plate 340, and the slider 420 may move according to the movement of the sliding protrusion 421. Since another sliding protrusion of the slider 420 moves along a spiral groove of the other third rotating plate 340', the other third rotating plate 340' may be interlocked with a rotation of the third rotating plate 340.

Since the third rotating plate 340 and the other third rotating plate 340' corresponding to the third rotating plate 340 are interlocked and rotated, the first rotating plate 320, the second rotating plate, and the rotating plates 320' and 330' corresponding to the first rotating plate 320 and the second rotating plate 330 may also be interlocked and rotated.

The third rotating plate 340 may include a cam seating portion 830. A body 411 of the cam member 410 may be seated in the cam seating portion 830. The cam member 410 may include the body 411, a latch 412, and a cam 413. The body 411 may be seated on the seating portion 830 and may rotate according to a rotation of the third rotating plate 340. The latch 412 may be disposed to be in contact with a surface of the third rotating plate 340 to prevent unintended movement of the cam member 410. The cam 413 may rotate along a cam mountain 2310 by a rotation of a third member. An inner surface of the cam mountain 2310 may be formed as a curved surface corresponding to a curved surface forming an outer surface of the cam 413.

According to an embodiment, since the cam mountain 2310 has the curved surface corresponding to the outer surface of the cam 413, the cam 413 may provide resistance that hinders movement at a designated position of the cam mountain 2310, and the cam 413 may provide a driving force at another position of the cam mountain 2310 that is distinguished from the designated position. The cam mountain 2310 may limit a rotation angle of the third rotating plate 340.

Figure 22:
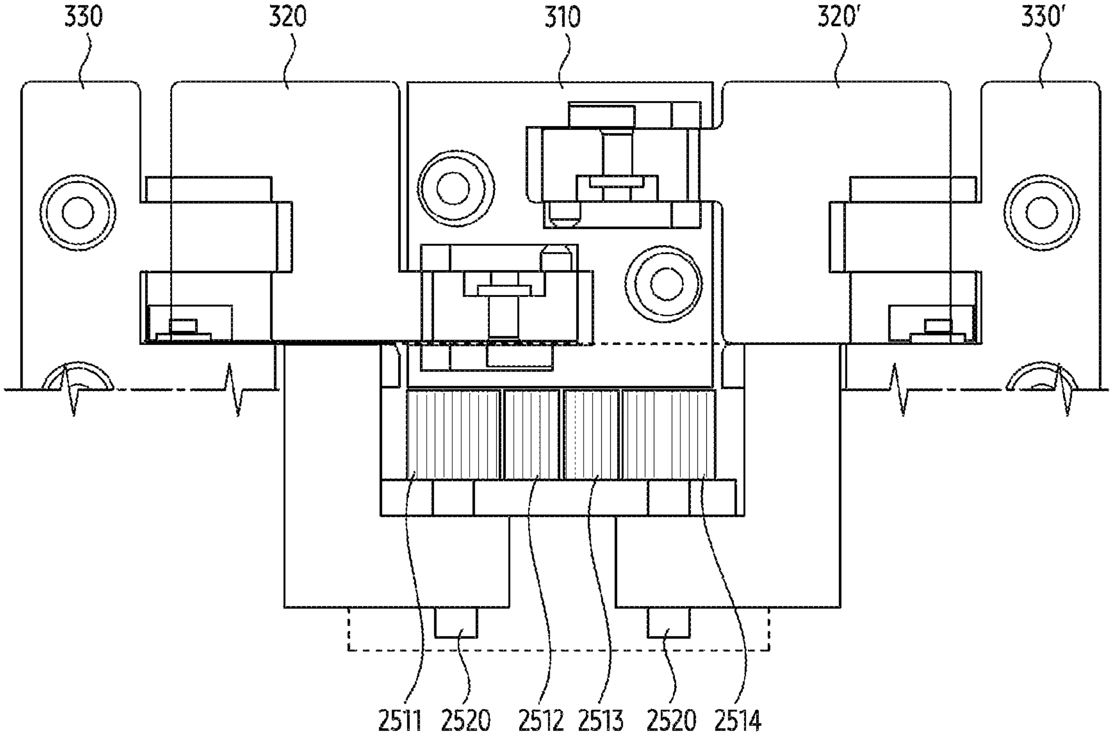
FIG. 22 illustrates an interlocking structure using a gear of an electronic device, according to an embodiment.

FIG. 22 illustrates an interlocking structure using a gear of an electronic device, according to an embodiment.

Referring to FIG. 22, an electronic device may include a plurality of gears 2511, 2512, 2513, and 2514 in order to interlock a first rotating plate 320 and another first rotating plate 320' corresponding to the first rotating plate 320. The first rotating plate 320 may be connected to a rotation axis 2520 of the first gear 2511 to transmit rotational force of the first rotating plate 320. The other first rotating plate 320' corresponding to the first rotating plate 320 may be connected to the rotation axis 2520 of the fourth gear 2514 to transmit rotational force of the other first rotating plate 320' corresponding to the first rotating plate 320. When the first gear 2511 rotates, the second gear 2512 rotates as a driven gear, and the third gear 2513 may rotate at the same angular velocity with the same the second gear 2512. The fourth gear 2514 may rotate at the same angular velocity as the first gear 2511 by a rotation of the third gear 2513.

According to an embodiment, since the first gear 2511 rotates at the same speed as the fourth gear 2514, the first rotating plate 320 sharing a shaft with the first gear 2511 and another first rotating plate 320' corresponding to the first rotating plate 320 sharing a shaft with the fourth gear 2514 may be interlocked and rotate. Since the first rotating plate 320 is interlocked with the other first rotating plate 320' corresponding to the first rotating plate 320, the second rotating plate 330 may be interlocked with another second rotating plate 330' corresponding to the second rotating plate 330.

According to an embodiment, an electronic device (e.g., the electronic device 101 of FIG. 1) may comprise a first housing (e.g., the first housing 210 of FIG. 2A) including a first surface and a second surface faced away from the first surface, a second housing (e.g., the second housing 220 of FIG. 2A) including a third surface and a fourth surface faced away from the third surface, a display (e.g., the flexible display 230 of FIG. 2A) including a first area (e.g., the first display area 231 of FIG. 2A) disposed on the first surface and a second area (e.g., the second display area 232 of FIG. 2A) disposed on the third surface and a third area (e.g., the third display area 233 of FIG. 2A) disposed between the first area and the second area, and disposed on the first surface and the third surface, and a hinge structure (e.g., the hinge structure 260 of FIG. 2A) rotatably connecting the first housing and the second housing, and wherein the hinge structure may include a body (e.g., the body 310 of FIG. 3A) including a first guide groove forming a first rotation path having and a second groove forming a second rotation path having a second rotation axis different from the first rotation axis, and facing the third area of the display, a first rotating plate (e.g., the first rotating plate 320 of FIG. 3A) including a first pin in the first guide groove moved along the first rotation path and a second pin in the second guide groove moved along the second rotation path while the first pin is moved to pivotably connect to a side of the body, and a second rotating plate (e.g., the second rotating plate 330 of FIG. 3A) supporting the first housing and pivotably connected to the first rotating plate, the second rotating plate having a slope relative to the first rotating plate in a folded state of the electronic device in which a first direction in which the first surface faces is different from a second direction in which the third surface faces.

According to an embodiment, the first rotating plate may move away from the body while changing to the folded state of the electronic device by the first rotation axis different from the second rotation axis.

According to an embodiment, the first pin may extend along a shape of the guide groove to prevent disassembly from the first guide groove.

According to an embodiment, the first pin may be rotatable relative to the first rotating plate while moving along the first guide groove.

According to an embodiment, the first pin may include a spring (e.g., the elastic member 2030 of FIG. 18A) surrounding a rotation axis of the first pin to provide frictional force at a designated position of the first guide groove.

According to an embodiment, the electronic device may further include a third rotating plate (e.g., the third rotating plate 340 of FIG. 3A) pivotably connected to the body and disposed to a side surface of the first rotating plate, and wherein the third rotating plate may limit movement of the second rotating plate according to movement of the first rotating plate while the electronic device changes to the folded state.

According to an embodiment, the third rotating plate may be pivotably connected to the second rotating plate.

According to an embodiment, a rotation axis pivotably connecting the first rotating plate and the second rotating plate may be different from a rotation axis pivotably connecting the second rotating plate and the third rotating plate.

According to an embodiment, a rotation axis (e.g., the variable rotation axis 350 of FIG. 3B) pivotably connecting the first rotating plate and the body may be different from a rotation axis (e.g., the second rotation axis 362 of FIG. 3B) pivotably connecting the third rotating plate and the body.

According to an embodiment, the rotation axis pivotably connecting the first rotating plate and the body may be variable by the first pin moving along the first rotation path and the second pin moving along the second rotation path.

According to an embodiment, the third rotating plate may include a spiral groove formed on a surface opposite to a surface facing the display.

According to an embodiment, the electronic device may further include a sliding member including a protrusion inserted into the spiral groove, and wherein the protrusion may move along the spiral groove, while the electronic device transitions from an unfolded state to the folded state.

According to an embodiment, the first pin of the first plate may be coaxially connected to a gear of a plurality of gears included in the hinge structure.

According to an embodiment, the body may include a connecting portion in which the first pin and the second pin is disposed and protruding from a side surface of the first rotating plate, and wherein the connecting portion may be inserted into a seating portion formed from a side surface of the body toward inside.

According to an embodiment, the first pin may be formed on a surface contacting with a side surface of the seating portion, from among surfaces of the connecting portion, and the second pin may be formed on another surface opposite to the surface contacting with the side surface of the seating portion, from among surfaces of the connecting portion, and the seating portion may have the second guide groove formed on a surface opposite to a surface in which the first guide groove is formed in which the first pin is accommodated.

According to an embodiment, a hinge structure (e.g., the hinge structure 260 of FIG. 2A) may include a body opposite to a third area of the display, a first rotating plate pivotably connected to a part of the body, a second rotating plate pivotably connected to the first rotating plate, a third rotating plate pivotably connected another side surface facing the part of the body based on a folding axis, and a fourth rotating plate pivotably connected to the third rotating plate, and wherein the second rotating plate may have a slope relative to the first rotating plate in a folded state of the electronic device in which a first direction in which the first surface faces is different from a second direction in which the third surface faces.

According to an embodiment, in a fully folded state of the electronic device in which the first direction and the second direction are opposite to each other, an angle between a direction in which a surface of the first rotating plate facing the display faces and a direction in which a surface of the third rotating plate facing the display faces may be an obtuse angle.

According to an embodiment, in the fully folded state of the electronic device, a direction in which a surface of the second rotating plate facing the display faces may be opposite to a direction in which a surface of the fourth rotating plate facing the display faces.

According to an embodiment, the body may include a first guide groove forming a first rotation path and a second guide groove forming a second rotation path having a second rotation axis different from a first rotation axis of the first rotation path, and wherein the first rotating plate may include a first pin in the first guide groove moved along the first rotation path and a second pin in the second guide groove moved along the second rotation path while the first pin moves.

According to an embodiment, the first rotating plate may move away from the body due to differentness between the first rotation axis and the second rotation axis while the electronic device is switched to the folded state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- a first housing;
- a second housing rotatably coupled to the first housing;
- a display including a portion to be bent in accordance with a rotation of the second housing with respect to the first housing; and
- a hinge structure rotatably connecting the first housing and the second housing;
- wherein the hinge structure includes:
  - a body disposed to overlap the portion of the display, the body including:
    - a first guide groove forming a first rotation path having a first rotation axis; and
    - a second guide groove forming a second rotation path having a second rotation axis different from the first rotation axis;
  - a first rotating plate including:
    - a first pin in the first guide groove configure to move along the first rotation path; and
    - a second pin in the second guide groove configure to move along the second rotation path while the first pin is moved along the first rotation path, wherein a rotation axis, pivotably connecting the first rotating plate and the body, varies when the first pin is moved along the first rotation path and the second pin is moved along the second rotation path; and
  - a second rotating plate supporting the first housing and pivotably connected to the first rotating plate, the second rotating plate having a slope relative with respect to the first rotating plate in a folded state of the electronic device.

2. The electronic device of claim 1, wherein the first rotating plate moves away from the body while changing to the folded state of the electronic device by the first rotation axis different from the second rotation axis.

3. The electronic device of claim 1, wherein the first pin extends along a shape of the first guide groove to prevent disassembly from the first guide groove.

4. The electronic device of claim 1, wherein the first pin is rotatable with respect to the first rotating plate while moving along the first guide groove.

5. The electronic device of claim 1, wherein the first pin includes a spring surrounding a rotation axis of the first pin to provide frictional force at a designated position of the first guide groove.

6. The electronic device of claim 1, further comprising a third rotating plate pivotably connected to the body and disposed to a side surface of the first rotating plate, and
- wherein the third rotating plate limits movement of the second rotating plate according to movement of the first rotating plate while the electronic device changes to the folded state.

7. The electronic device of claim 6, wherein the third rotating plate is pivotably connected to the second rotating plate.

8. The electronic device of claim 7, wherein a rotation axis pivotably connecting the first rotating plate and the second rotating plate is different from a rotation axis pivotably connecting the second rotating plate and the third rotating plate.

9. The electronic device of claim 8, wherein the rotation axis pivotably connecting the first rotating plate and the body is different from a rotation axis pivotably connecting the third rotating plate and the body.

10. The electronic device of claim 6, wherein the third rotating plate includes a spiral groove on a surface opposite to a surface facing the display.

11. The electronic device of claim 10, further comprising: a sliding member including a protrusion inserted into the spiral groove, and
- wherein the protrusion moves along the spiral groove, while the electronic device transitions from an unfolded state to the folded state.

12. The electronic device of claim 1, wherein the first pin of the first rotating plate is coaxially connected to a gear of a plurality of gears included in the hinge structure.

13. The electronic device of claim 1, wherein the first rotating plate includes a connecting portion, on which the first pin and the second pin are disposed, protruding from a side surface of the first rotating plate, and
- wherein the connecting portion is inserted into a seating portion formed from a side surface of the body toward inside.

14. The electronic device of claim 13, wherein the first pin is formed on a surface from among surfaces of the connecting portion, the surface in contact with a side surface of the seating portion, and
- wherein the second pin is formed on another surface from among the surfaces of the connecting portion, the another surface opposite to the surface in contact with the side surface of the seating portion, and
- wherein the seating portion has the second guide groove formed on a surface opposite to a surface in which the first guide groove is formed in which the first pin is accommodated.

15. A foldable electronic device comprising:
- a first housing including a first surface and a second surface opposite to the first surface;
- a second housing including a third surface and a fourth surface opposite to the third surface;
- a display including a first area disposed on the first surface and a second area disposed on the third surface and a third area disposed between the first area and the second area, and disposed on the first surface and the third surface; and a hinge structure rotatably connecting the first housing and the second housing;

wherein the hinge structure includes:

a body including a first guide groove forming a first rotation path having a first rotation axis and a second guide groove forming a second rotation path having a second rotation axis different from the first rotation axis, and facing the third area of the display;

a first rotating plate including a first pin in the first guide groove moved along the first rotation path and a second pin in the second guide groove moved along the second rotation path while the first pin is moved to pivotably connect to a side of the body; and a second rotating plate supporting the first housing and pivotably connected to the first rotating plate, the second rotating plate having a slope relative to the first rotating plate in a folded state of the electronic device in which a first direction in which the first surface faces is different from a second direction in which the third surface faces, and wherein the first rotating plate rotates about a variable rotation axis defined by movement of the first pin along the first rotation path defined by the first guide groove and movement of the second pin along the second rotation path defined by the second guide groove.

16. The foldable electronic device of claim 15, wherein the first rotating plate moves away from the body while changing to the folded state of the foldable electronic device by the first rotation axis different from the second rotation axis.

17. The foldable electronic device of claim 15, wherein the first pin extends along a shape of the first guide groove to prevent disassembly from the first guide groove.

18. The foldable electronic device of claim 15, wherein the first pin is rotatable with respect to the first rotating plate while moving along the first guide groove.

19. The foldable electronic device of claim 15, wherein the first pin includes a spring surrounding a rotation axis of the first pin to provide frictional force at a designated position of the first guide groove.

* * * * *